US010523957B2

(12) United States Patent
Gudumasu et al.

(10) Patent No.: US 10,523,957 B2
(45) Date of Patent: Dec. 31, 2019

(54) OPTIMIZATION USING MULTI-THREADED PARALLEL PROCESSING FRAMEWORK

(71) Applicant: VID SCALE, INC., Wilmington, DE (US)

(72) Inventors: Srinivas Gudumasu, San Diego, CA (US); Yuwen He, San Diego, CA (US); Yan Ye, San Diego, CA (US); Ralph Neff, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 237 days.

(21) Appl. No.: 15/516,129

(22) PCT Filed: Aug. 10, 2015

(86) PCT No.: PCT/US2015/054743
§ 371 (c)(1),
(2) Date: Mar. 31, 2017

(87) PCT Pub. No.: WO2016/057817
PCT Pub. Date: Apr. 14, 2016

(65) Prior Publication Data
US 2017/0310983 A1    Oct. 26, 2017

Related U.S. Application Data

(60) Provisional application No. 62/061,648, filed on Oct. 8, 2014.

(51) Int. Cl.
*H04N 19/436* (2014.01)
*H04N 19/31* (2014.01)
(Continued)

(52) U.S. Cl.
CPC ......... *H04N 19/436* (2014.11); *H04N 19/127* (2014.11); *H04N 19/136* (2014.11);
(Continued)

(58) Field of Classification Search
CPC .. H04N 19/436; H04N 19/127; H04N 19/136; H04N 19/177; H04N 19/31; H04N 19/61; H04N 19/96
(Continued)

(56) References Cited

U.S. PATENT DOCUMENTS

2008/0165864 A1    7/2008  Eleftheriadis et al.
2011/0311152 A1*  12/2011  Takahashi ............ H04N 19/159
                                                        382/236
(Continued)

FOREIGN PATENT DOCUMENTS

KR    10-2014-0052831 A    5/2014
WO    WO 2010/056315 A1    5/2010

OTHER PUBLICATIONS

Bross et al., "High Efficiency Video Coding (HEVC) Text Specification Draft 10 (for FDIS & Last Call)", JCTVC-L1003, 12th Meeting: Geneva, CH, Jan. 14-23, 2013, 310 pages.
(Continued)

*Primary Examiner* — William C Vaughn, Jr.
*Assistant Examiner* — Jae N Noh
(74) *Attorney, Agent, or Firm* — Condo Roccia Koptiw LLP

(57) ABSTRACT

Systems, methods, and instrumentalities are disclosed for encoder and/or decoder optimization using a multi-threaded parallel processing framework. An encoding and/or decoding device may receive a video sequence that includes a plurality of first-temporal level pictures associated with a first temporal level and a plurality of second-temporal level pictures associated with a second temporal level. The encoding and/or decoding device may allocate a first number of parallel processing threads for encoding and/or decoding the first-temporal level pictures and a second number of parallel processing threads for encoding and/or decoding the second-
(Continued)

temporal level pictures. The device may perform this allocation based on temporal level priority, for example. The encoding and/or decoding device may encode and/or decode the first-temporal level pictures and the second-temporal level pictures. This encoding and/or decoding may be based on the allocation of the first number of parallel processing threads and the second number of parallel processing threads.

26 Claims, 29 Drawing Sheets

(51) Int. Cl.
    *H04N 19/127*     (2014.01)
    *H04N 19/136*     (2014.01)
    *H04N 19/177*     (2014.01)
    *H04N 19/61*     (2014.01)
    *H04N 19/96*     (2014.01)
(52) U.S. Cl.
    CPC ........... *H04N 19/177* (2014.11); *H04N 19/31* (2014.11); *H04N 19/61* (2014.11); *H04N 19/96* (2014.11)
(58) Field of Classification Search
    USPC .................................................... 375/240.02
    See application file for complete search history.

(56) References Cited

U.S. PATENT DOCUMENTS

| | | | | |
|---|---|---|---|---|
| 2013/0114744 | A1* | 5/2013 | Mutton | H04N 19/40 375/240.26 |
| 2014/0254669 | A1* | 9/2014 | Rapaka | H04N 19/50 375/240.12 |
| 2015/0288970 | A1 | 10/2015 | Park et al. | |
| 2015/0304667 | A1* | 10/2015 | Suehring | H04N 19/70 375/240.02 |

OTHER PUBLICATIONS

Chen et al., "Efficient SIMD Optimization of HEVC Encoder over X86 Processors", Signal & Information Processing Association Annual Summit and Conference (APSIPA ASC), 2012 Asia-Pacific, Dec. 3-6, 2012, 4 pages.

Chi et al., "Parallel Scalability and Efficiency of HEVC Parallelization Approaches", IEEE Transactions on Circuits and Systems for Video Technology, vol. 22, No. 12, Dec. 2012, pp. 1-12.

Clare et al., "Wavefront Parallel Processing for HEVC Encoding and Decoding", JCTVC-F274, m20694, 6th Meeting: Torino, IT, Jul. 14-22, 2011, 16 pages.

Fuldseth et al., "Tiles", Tech. Rep., Joint Collaborative Team on Video Coding (JCT-VC) of ITU-T SG16 WP3 and ISO/IEC JTC1/SC29/WG11 5th Meeting, JCTVC-E408, Geneva, CH, Mar. 16-23, 2011, 14 pages.

Henry et al., "Wavefront Parallel Processing", Joint Collaborative Team on Video Coding (JCT-VC) of ITU-T SG16 WP3 and ISO/IEC JTC1/SC29/WG11 5th Meeting, JCTVC-E196, WG11 No. m19714, Geneva, CH, Mar. 16-23, 2011, 9 pages.

Intel Corporation, "Intel® Architecture Instruction Set Extensions Programming Reference", Ref. # 319433-015, Jul. 2013, 934 pages.

Misra et al., "Lightweight Slicing for Entropy Coding", Sharp, Document: JCTVC-D070, WG11 No. m18820, 4th Meeting: Daegu, KR, Jan. 20-28, 2011, 7 pages.

Sullivan et al., "Overview of the High Efficiency Video Coding (HEVC) Standard", IEEE Transactions on Circuits and Systems for Video Technology, vol. 22, No. 12, Dec. 2012, pp. 1649-1668.

Sullivan et al., "Rate-Distortion Optimization for Video Compression", IEEE Signal Processing Magazine, vol. 15, No. 6, Nov. 1998, pp. 74-90.

Videolan, "X265 Encoder", Available online at http://www.videolan.org/developers/x265.html, retrieved on Jul. 14, 2014, 2 pages.

Zhao et al., "Efficient Realization of Parallel HEVC Intra Encoding", IEEE International Conference on Multimedia and Expo Workshops (ICMEW), Jul. 15-19, 2013, 6 pages.

* cited by examiner

| POC 8 | POC 4 | POC 2 | POC 1 | POC 3 | POC 6 | POC 5 | POC 7 |

FIG. 10

| POC 8 | POC 4 | POC 2 | POC 6 | POC 1 | POC 3 | POC 5 | POC 7 |

FIG. 11

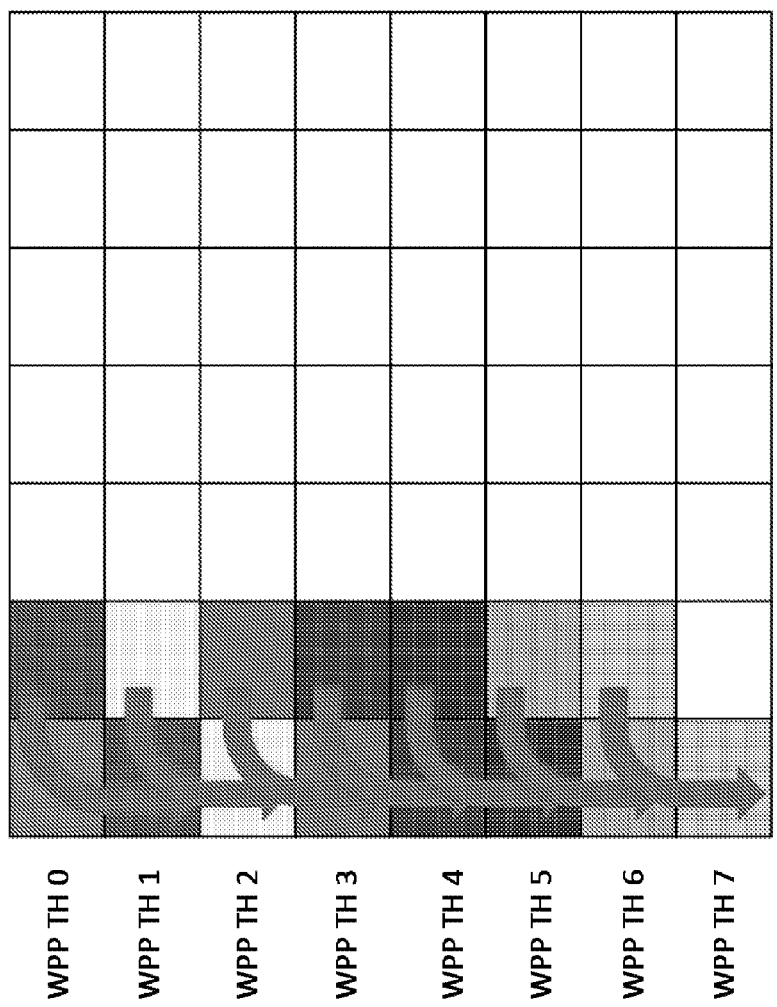

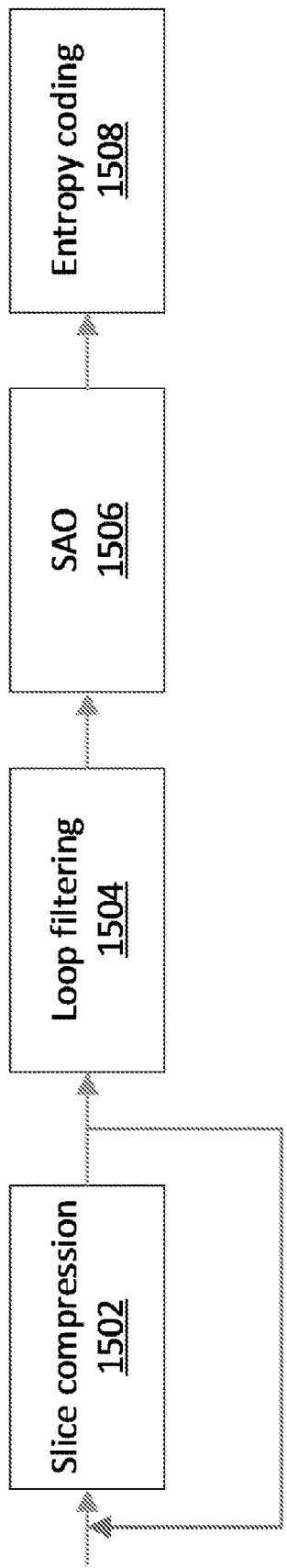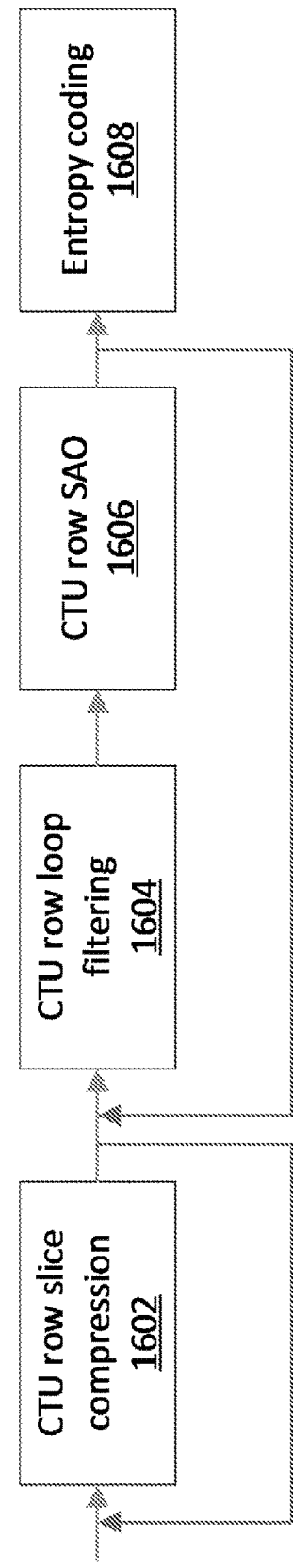
FIG. 15
FIG. 16

OPTIMIZATION USING MULTI-THREADED PARALLEL PROCESSING FRAMEWORK

CROSS REFERENCE

This application is the National Stage Entry under 35 U.S.C. § 371 of Patent Cooperation Treaty Application No. PCT/US2015/054743, filed Oct. 8, 2015, which claims the benefit of U.S. Provisional Application No. 62/061,648 filed on Oct. 8, 2014, which is incorporated herein by reference as if fully set forth.

BACKGROUND

Digital video services are rapidly expanding beyond fixed TV services over satellite, cable and terrestrial broadcasting to Internet-enabled mobile devices. Advances in resolution and computational capabilities of consumer devices (e.g., smart phones and tablets), expansion of video applications (e.g., video chat, mobile video recording, sharing and streaming) and an ever-increasing number of device and video consumers and producers have led to an increase in mobile video content generation and delivery. Consequently, demand has increased for video coding support for high resolutions (e.g., HD, fullHD and UHD) in consumer devices.

Video coding systems may be used to compress digital video signals to reduce storage requirements and/or transmission bandwidth. Different types of video coding systems include block-based, wavelet-based, object-based and block-based hybrid video coding systems. Block-based video coding systems may be based on international video coding standards, such as MPEG1/2/4 part 2, H.264/MPEG-4 part 10 Advanced Video Coding (MPEG-4 AVC), VC-1 and High Efficiency Video Coding (HEVC)/H.265 standards. Some block-based video coding systems may have suboptimal coding and/or suboptimal operation. Improvements in operation (e.g., encoding and/or decoding speed) may result in suboptimal coding (e.g., loss of compression efficiency).

SUMMARY

Systems, methods, and instrumentalities are disclosed for encoder (e.g., HEVC encoder) and decoder (e.g., HEVC decoder) optimization using a multi-threaded parallel processing framework. Optimization may be implemented by a multi-level, multi-threaded parallel processing framework, which may be applied at picture and/or slice levels.

A video coding device (e.g., encoding and/or decoding device) may include one or more processors that may allocate parallel processing threads amongst pictures based on their respective temporal level (TL) priority. For example, a video sequence that may include pictures associated with different temporal levels may be received.

The video sequence may include a plurality of first-temporal level pictures associated with a first temporal level and a plurality of second-temporal level pictures associated with a second temporal level. For example, the second-temporal level pictures may be non-reference pictures, and the first-temporal level pictures may be reference pictures. The video coding device may allocate, based on temporal level priority, a first number of parallel processing threads for encoding and/or decoding the first-temporal level pictures and a second number of parallel processing threads for encoding and/or decoding the second-temporal level pictures. For example, the first number of parallel processing threads may be larger than the second number of parallel processing threads, e.g., if the first temporal level is associated with a higher priority than the second temporal level. A portion of the first number of parallel processing threads may be allocated to a picture within the first-temporal level pictures based on the amount of times other pictures reference the first picture.

The first-temporal level pictures and the second-temporal level pictures may be encoded and/or decoded based on the allocation. For example, the first-temporal level pictures may be coded using the allocated first number of the parallel processing threads, and in parallel, the second-temporal level pictures may be coded using the allocated second number of the parallel processing threads.

The parallel processing threads may be allocated such that the low-temporal level pictures of a group of pictures (GOP) may be coded in parallel with high-temporal level pictures of another GOP. For example, a first GOP and a second GOP may each include first-temporal level pictures and second-temporal level pictures. When the first temporal level pictures of the first GOP have finished being coded, the threads allocated for coding the first-temporal level pictures may be used to code the first-temporal level pictures of the second GOP. The first-temporal level pictures of the second GOP and the second-temporal level pictures of the first GOP may be encoded or decoded in parallel using, e.g., their respective allocated parallel processing threads.

In an embodiment, the parallel processing threads may be allocated to pictures in a GOP. The threads may be allocated to code the first-temporal level pictures (e.g., pictures associated with higher priority) first, before being allocated to code the second-temporal level pictures (e.g., pictures associated with lower priority). When coding the second-temporal level pictures, the parallel processing threads may be allocated among the second-temporal level pictures in a round robin style. The threads may be evenly distributed among the second-temporal level pictures.

In an embodiment, the parallel processing threads may be allocated to pictures in different GOPs based at least in part on GOP priority. For example, the video coding device may allocate available parallel processing threads to a first GOP and a second GOP based on their respective GOP priority.

A video coding device may include a processor configured to receive a video sequence having multiple pictures. The device may determine the number of parallel processing threads to be allocated to code a picture based on whether the picture is referenced by other pictures in the video sequence. The number of parallel processing threads to be allocated to a picture may be determined based on the frame type of the picture (e.g., i-frame, b-frame, or p-frame). The number of parallel processing threads to be allocated to a picture may be determined based on the temporal hierarchy, and/or coding complexity. The picture may be coded using the allocated threads.

BRIEF DESCRIPTION OF THE DRAWINGS

FIG. 10 shows an example of an encoding order for an HEVC encoder with random access main configuration.

FIG. 11 shows an example of a modified encoding order for an HEVC encoder with random access main configuration.

FIG. 12A shows an example of context-based adaptive binary arithmetic coding (CABAC) dependency using wavefront parallel processing (WPP) methodology.

FIG. 15 shows an example of sequential processing of slice compression, deblocking and Sample Adaptive Offsets (SAO) processing.

FIG. 16 shows an example of parallel processing of slice compression, deblocking and SAO processing based on a coding tree unit (CTU) row.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

High Efficiency Video Coding (HEVC) may support parallel processing, for example, for multi- and many-core architectures. HEVC may support different picture partition strategies, such as slices, wavefront parallel processing (WPP) and tiles, for example, for high-level parallelism.

Figure 1:
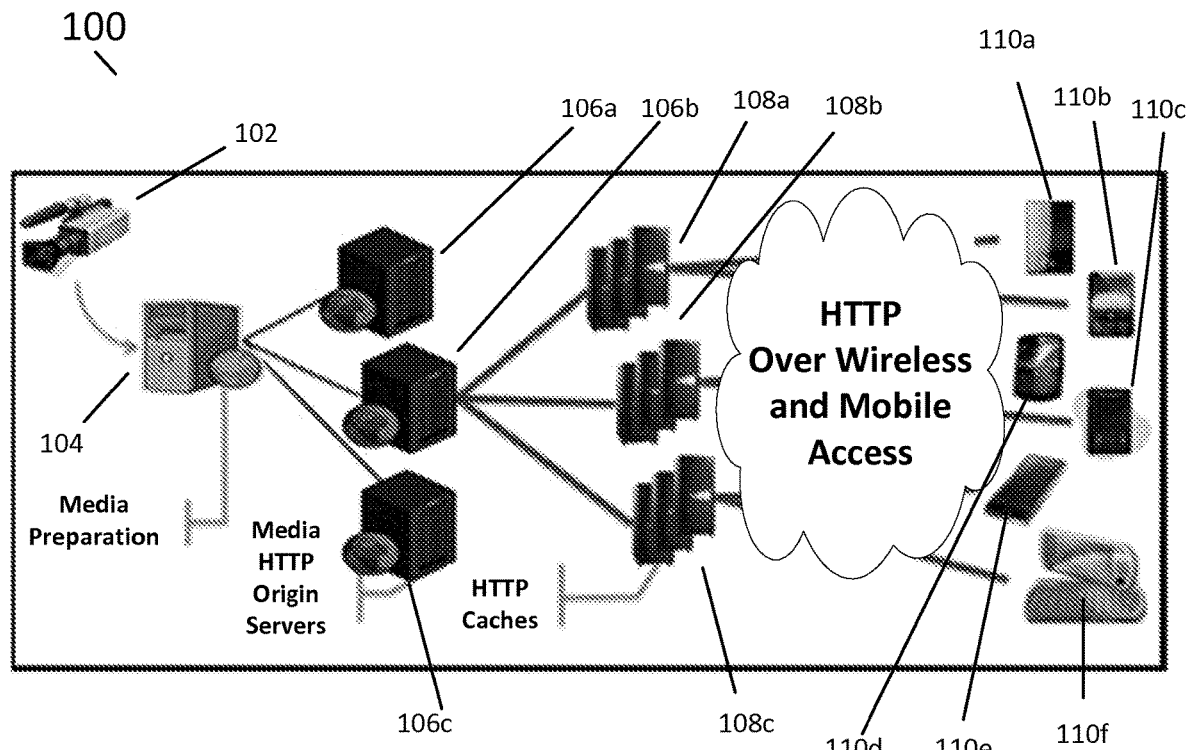
FIG. 1 is an example of a system in which High Efficiency Video Coding (HEVC) video coding technologies may be implemented.

FIG. 1 shown an example system in which HEVC video coding technologies may be implemented. The system may include a Hypertext Transfer Protocol (HTTP) based video streaming system. A media capture device 102 may capture media (e.g., video, photograph, audio, etc.). In an example, as depicted on FIG. 1, the media capture device 102 may include a video camcorder, camera, voice recorder, smart phone, tablet, or any other device that has media capturing abilities.

The media captured from the media capture device 102 may be transferred to a media preparation device 104, for preparing the media. In some examples, the media collection device 102 and the media preparation device 104 may be independent devices. In other examples, however, the media collection device 102 may include the capability to collect the media as well as the ability to prepare the media. The media collection device 102 may also serve as the media preparation device 104. In an example, the media preparation device 104 may compress and chop the media into small segments, where a segment period is, for example, between two and ten seconds of video.

After the media is prepared by the media preparation device 104, the media may be transferred to a wireless transfer receive unit (WTRU) 110a, b, c, d, e, and/or f (collectively, referred to as 110). In an example, the media may be transferred to a WTRU 110 from a media HTTP origin server 106. In some examples, HTTP cache devices 108 may be used to store previously transferred media to assist in the delivery of the media from HTTP origin server 106 to WTRU 110.

Figure 2:
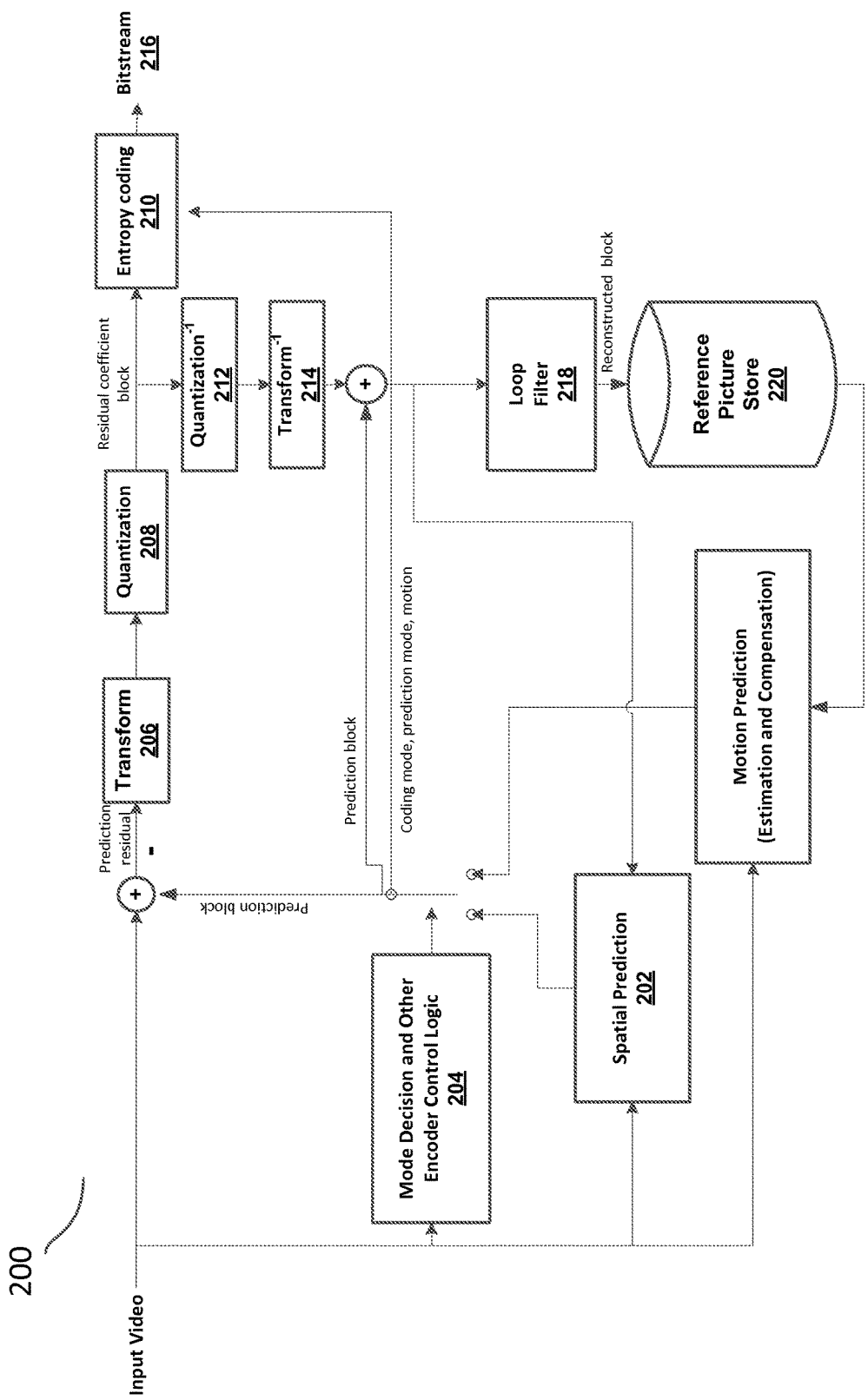
FIG. 2 is an example of a block-based video encoder in which HEVC video coding technologies may be implemented.

FIG. 2 is a block diagram of an example block-based video encoder 200 in which HEVC video coding technologies may be implemented. In an example, video encoder 200 may be a single layer video encoder. Video encoder 200 may be used, for example, to generate bit streams for a video streaming system, such as the video streaming system shown in FIG. 1. As shown in FIG. 2, the encoder 200 may employ techniques, such as spatial prediction 202 (e.g., intra prediction) and temporal prediction (e.g., inter prediction and/or motion compensated prediction) to predict the input video signal and achieve efficient compression.

Mode decision logic 204 may select the most suitable form of prediction. Selection criteria may be based on a combination of rate and distortion considerations. In an example, the encoder may transform 206 and quantize 208 a prediction residual, where a prediction residual may be a difference signal between the input signal and the prediction signal. A quantized residual, together with the mode information (e.g., intra or inter prediction) and prediction information (e.g., motion vectors, reference picture indexes, intra prediction modes) may be further compressed by entropy coder 210, which may generate an output video bitstream 216.

As shown in FIG. 2, video encoder 200 may generate a reconstructed video signal by applying an inverse quantization 212 and inverse transform 214 to the quantized residual to obtain a reconstructed residual, which may be added to the prediction signal. The reconstructed video signal may be processed through a loop filter (LF) process 218 (e.g., deblocking filter (DB), Sample Adaptive Offsets (SAO) or Adaptive Loop Filters (ALF)). Reconstructed video blocks may be stored in reference picture store 220. Reconstructed video blocks may be used to predict a future video signal.

Figure 3:
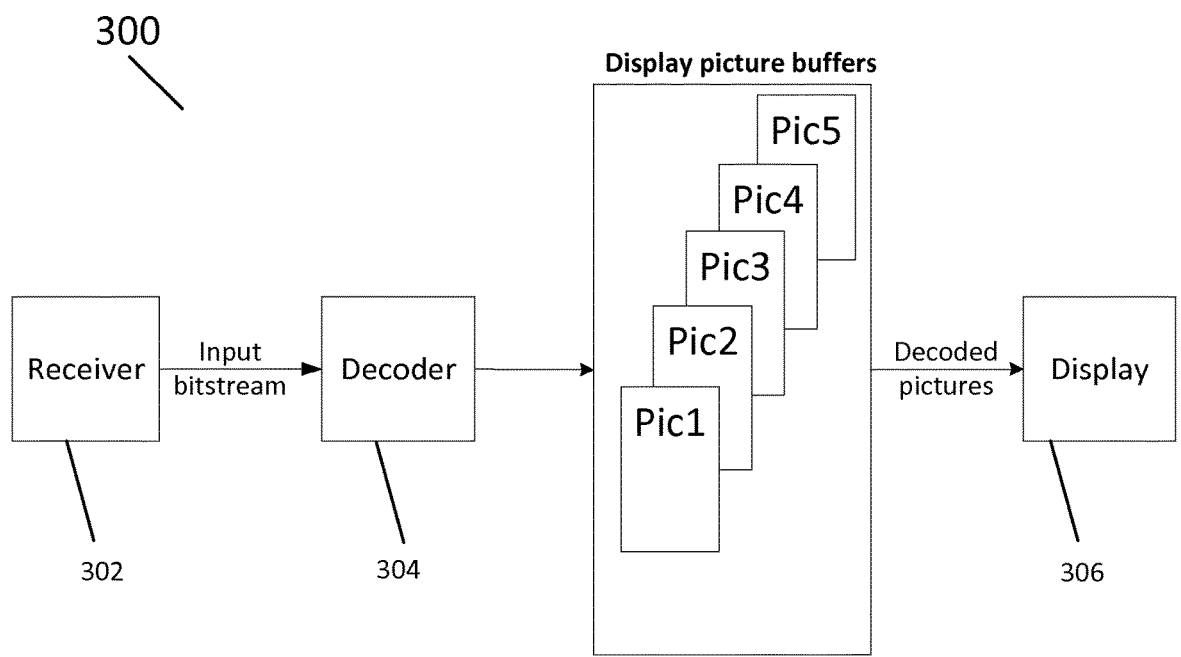
FIG. 3 shows an example of a video playback system in which HEVC video coding technologies may be implemented.

FIG. 3 shows a block diagram of an example video playback system in which HEVC video coding technologies may be implemented. Video playback system may include a receiver 302, decoder 304, and display (renderer) 306. Receiver 302 may receive the media. In some examples, the media received by the receiver 302 may include encoded media. The decoder 304 may receive the encoded media from the receiver 302 and may decode the encoded data. The decoder 304 may decode the encoded and transmit the decoded data to the display 306 for viewing by the user.

Figure 4:
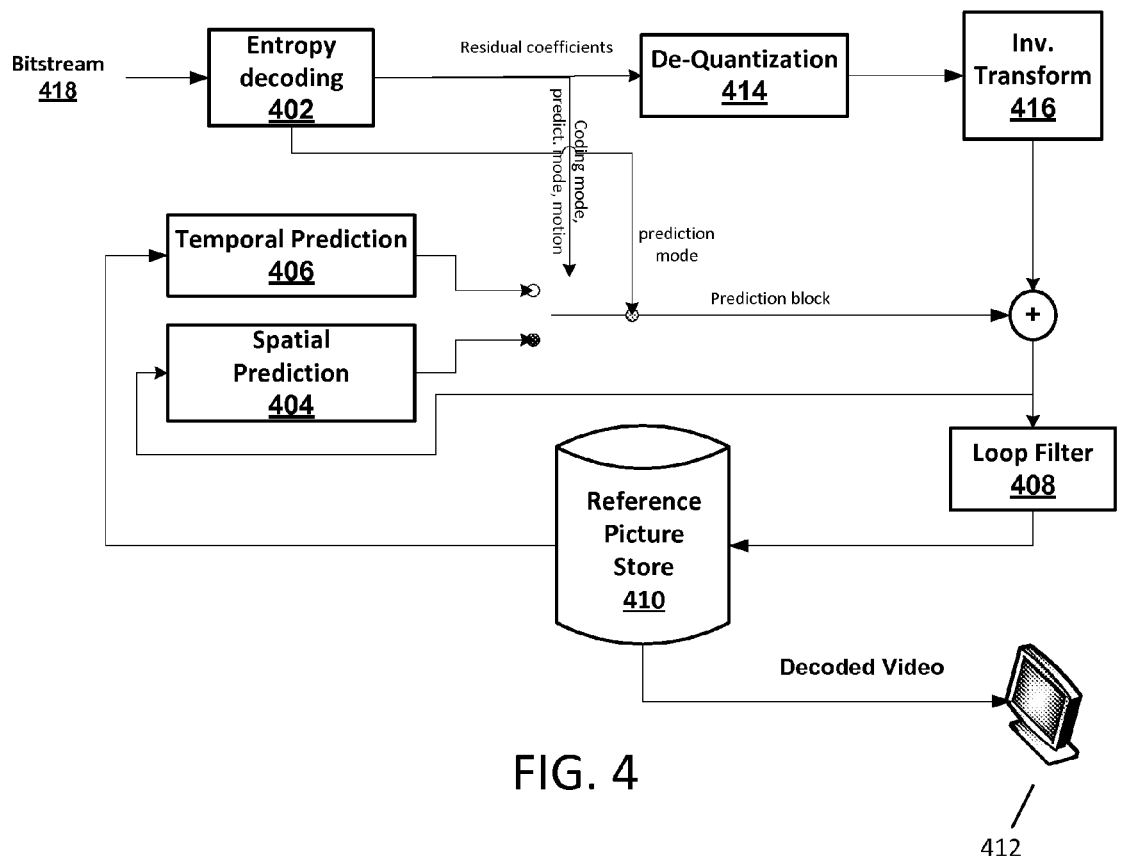
FIG. 4 is an example of a block-based video decoder. Video decoder may be a single layer video decoder.

FIG. 4 shows an example block-based video decoder. Video decoder may be a single layer video decoder. Video decoder may receive a video bitstream produced by an encoder, such as the encoder shown in FIG. 2. Video decoder may reconstruct the video signal, e.g., for display on a display device 412. Entropy decoder 402 may parse video bitstream 418. Residual coefficients may be inverse quantized 414 and inverse transformed 416 to obtain a reconstructed residual. Coding mode and prediction information, e.g., generated by an encoder, may be used to obtain a prediction signal, for example, using either spatial prediction 404 or temporal prediction 406. A reconstructed video signal may be generated, for example, by adding the prediction signal and reconstructed residual. The reconstructed video signal may be processed through a loop filter (LF) process 408. The reconstructed video may be stored in a reference picture store 410. Reconstructed video may be displayed, via, for example, a display device 412, and/or used to decode a future video signal.

HEVC may provide block based hybrid video coding and decoding. An HEVC encoder and decoder may, for example, operate in accordance with examples of an encoder and decoder in FIGS. 2 and 4. HEVC may allow use of larger video blocks. HEVC may use quadtree partition to signal block coding information. A picture or slice may be partitioned into coding tree units (CTUs), which may be the same size (e.g., 64×64). A CTU may be partitioned into coding units (CUs), e.g., using quadtree-based partition. A CU may be partitioned into prediction units (PUs) and transform units (TUs), e.g., using quadtree-based partition.

Figure 5:
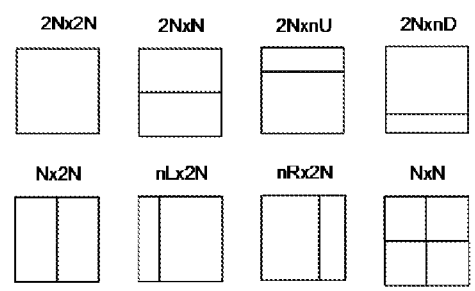
FIG. 5 shows an example of an implementation of HEVC with eight prediction unit (PU) modes for an inter-coded coding unit (CU).

A PU associated with an inter coded CU may be, for example, one of eight (8) partition modes. In an example, FIG. 5 shows an example of an implementation of HEVC with eight prediction unit (PU) modes for an inter-coded coding unit (CU).

An encoding process may involve inter picture prediction. Samples for a block may be predicted, for example, based on selected motion data, such as a reference picture and a motion vector (MV).

An encoder and decoder may generate identical inter picture prediction signals, for example, by applying motion compensation (MC) using an identical MV and mode decision data. The MV and mode decision data may be transmitted in a bitstream received by a decoder. Linear filters may be applied to obtain pixel values at fractional positions. Application of linear filters may depend on the precision of motion vectors. As an example, precision may be a quarter pixel. Interpolation filters may have, as an example, 7 or 8 taps for luma and 4 taps for chroma. A residual signal of intra or inter picture prediction (e.g., a difference between an original block and its prediction) may be transformed by a linear spatial transform.

Transform coefficients may be scaled, quantized, entropy coded, and transmitted together with prediction information. An encoder may duplicate a decoder processing loop, for example, so that encoder and decoder generate identical predictions for subsequent data. Quantized transform coefficients may be constructed by inverse scaling and inverse transforms. A decoded approximation of the residual signal may be generated. The residual may be added to the prediction. Deblocking (DB) and SAO filters may operate on the result, e.g., to smooth out artifacts induced by block-wise processing and quantization. A final picture representation may be stored in a decoded picture buffer. Decoded pictures may be used in prediction of subsequent pictures.

A deblocking filter may be content based. Different deblocking filter operations may be applied at the TU and PU boundaries. Filter operations may depend on a number of factors, such as coding mode difference, motion difference, reference picture difference and pixel value difference.

Entropy coding may comprise context-based adaptive binary arithmetic coding (CABAC). CABAC may be applied, for example, to most block level syntax elements. CABAC may not be applied to high level parameters. By-pass coding may be a special case in CABAC coding. For example, equal probability may be used to code binary symbols 0 and 1.

Video codecs, such as H.264/MPEG-4 AVC, may be parallelized. Parallelism may be, for example, frame-level, slice-level or macroblock level. Some approaches may have limited scalability, significant coding losses or large memory requirements.

HEVC coding tools, such as wavefront parallel processing (WPP) and tiles, for example, may facilitate high-level parallel processing. WPP and tile may allow subdivision of a picture into partitions that may be processed in parallel. A partition may have an integer number of coding tree units (CTUs). CTUs for a partition may or may not have dependencies on CTUs for other partitions. Coding tools (e.g., WPP or tiles) may be enabled and disabled. A bitstream may indicate entry point offsets, for example, signaled in a slice header, indicating a start position for entropy decoding of a partition.

HEVC encoder implementations, e.g., X265, may use WPP technology. WPP may enable parallel processing within one slice. WPP may be extended as overlapped wave-front (OWF). OWF may enable picture level parallel encoding. OWF technology may be considered as overlapping encoding of consecutive pictures using wave-fronts. OWF may enhance the efficiency of WPP. OWF may mitigate inefficiency of WPP caused by CABAC context synchronization. As an example, processing may begin on a next picture instead of waiting to complete encoding for a current picture, for example, when a thread has finished a CTU row in a current picture and there are no additional CTU rows to process.

Encoding may be performed faster, for example, by utilizing multi-core capabilities of CPUs in combination with parallelization techniques. Optimization techniques may achieve fast HEVC encoding without sacrificing compression performance.

Real time encoding performance may be improved. Some encoders, for example, HEVC reference software encoder or an HM encoder, optimize coding efficiency while maintaining a certain video quality. Video quality may be measured with objective quality metrics, such as peak signal to noise ratio (PSNR), video quality metric (VQM) and structural similarity index (SSIM). Video quality may be measured subjectively with human observers. Parallel processing approaches, such as Slices, WPP and Tiles, may improve encoding speed. However, an improvement in encoding speed may result in a loss of compression efficiency. For example, Slices and Tiles may break entropy encoding and prediction dependencies, which may prevent prediction across Slice or Tile boundaries.

WPP may result in a lower loss of compression efficiency compared to Slice and Tile parallel processing techniques. For example, WPP may be utilized to partition a picture into CTU rows while permitting prediction and entropy coding across CTU row boundaries.

A WPP technique may, for example, encode a CTU row by one thread. Multiple threads may operate in parallel. There may be a processing delay (e.g., a delay of two CTUs). A delay may be due to CABAC context synchronization between a current CTU row and its top CTU row. Delays may introduce parallelization inefficiencies. Inefficiencies may become more evident when a high number of WPP threads are used for encoding.

An OWF technique may have processing dependencies, e.g., caused by motion search. A future picture may be created using reconstructed samples of a reference picture for motion estimation. Reference pixels used for motion estimation may have already been processed by in-loop filters (e.g., deblocking, SAO). A CTU may not be ready for encoding until reference pixels within a motion search area in a reference picture have been encoded. This motion search dependency may limit the throughput of frame-level parallel processing threads encoding multiple frames.

As an example, assume there are three pictures P0, P1 and P2. P0 may be a reference picture for P1. P1 may be a reference picture for P2. Three threads T0, T1, T2 may be allocated to process the three pictures. A search window size may be SW×SH. A prediction unit (PU) size may be PW×PH. A PU of size PW×PH in P2 may have to wait for (SW+PW−1)×(SH+PH−1) pixels in P1 to complete encoding, and those (SW+PW−1)×(SH+PH−1) pixels in P1 may have to wait for (PW+2*SW−2)×(PH+2*SH−2) pixels in P0 to be encoded. As a result, thread T2 may be idle, waiting most of the time that threads T0 and T1 are working to finish encoding pictures P0 and P1. Delays may be amplified when the center of a search window, which may be determined by a motion predictor, is located toward an extremity of reference pictures P0 and/or P1. An extremity of a reference pictures may take longer to reach, such as when threads T0 and T1 work from one extremity to another (e.g., top to bottom) of a picture.

A challenge for encoder implementations, e.g., an HEVC encoder implementation, is to fully utilize available CPU computation resources for real-time encoding without compromising coding efficiency. CABAC dependency, among other dependencies, such as motion vector prediction between CTU rows, leads to idle frame processing threads waiting for threads processing reference pictures to finish.

Various optimization techniques may be used to reduce HEVC encoding time, e.g., on a platform with multi-core CPUs, without compromising compression efficiency, for example, compared to compression efficiency of an HM reference encoder.

HEVC encoding process optimization may include, but not limited to, instruction level optimization and process level optimization. Instruction level optimization may be implemented, for example, by Single Instruction Multiple Data (SIMD) instructions. Instruction level optimization may be applied, for example, to various time consuming modules in an encoder, such as motion compensation, distortion calculation in integer motion estimation by sum of absolute differences (SAD), distortion calculation measured by sum of absolute transformed differences (SATD) in fractional motion estimation (Hadamard transform), distortion calculation measured by sum of square errors (SSE) in rate distortion optimization (RDO) based mode decision, transform, inverse transform, quantization, de-quantization and reconstruction.

A multi-threaded (MT) parallel processing framework efficiently using CPU resources (e.g., multi-core resources) may use parallel processing techniques at CTU level within a slice and at picture level. Picture level parallel processing may depend, for example, on temporal levels considering a picture's referencing hierarchy. An example video coding device (e.g., an encoding device, a decoding device, etc.) may include a processor. In an example, the video coding device may receive a video sequence including first temporal level pictures and second temporal level pictures. The video coding device may allocate, based on temporal level priority, a number of parallel processing threads for coding (e.g., encoding and/or decoding) the first temporal level pictures and another number of parallel processing threads for coding the second temporal level pictures. The video coding device may code, e.g., the first temporal level pictures and the second temporal level pictures based on the allocation of the first number of parallel processing threads and the second number of parallel processing threads.

Figure 6:
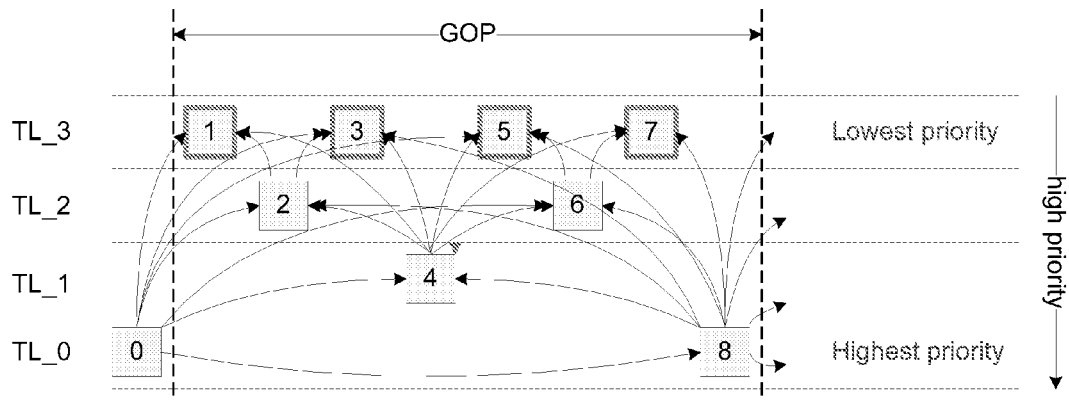
FIG. 6 is an example of an HEVC implementation with prioritized, hierarchical processing of HEVC coding when a group of pictures (GOP) size is 8.

FIG. 6 is an example of an HEVC implementation with prioritized, hierarchical processing of HEVC coding when a group of pictures (GOP) size is 8. Pictures may be separated into different temporal levels. Pictures at a temporal level may refer to pictures at the same or lower temporal level. FIG. 6, as an example, shows 9 pictures (e.g., picture order count (POC) 0, POC 1, POC 2, POC 3, POC 4, POC 5, POC 6, POC 7, and POC 8) being arranged according to 4 temporal levels (e.g., TL_0, TL_1, TL_2, TL_3). As depicted on FIG. 6, POC 0 and POC 8 may be the pictures having the lowest temporal level (and the highest priority), and POC 1, POC 3, POC 5, and POC 7 may be the pictures having the highest temporal level (and the lowest priority). Pictures at a lower temporal level may have a larger impact on whole sequence coding, for example, because more pictures may refer to (e.g. may depend on) pictures from the lower temporal levels. Because of their higher priorities, high impact pictures with smaller quantization parameters may be allocated with more bits. Further, in some examples, pictures at a highest temporal level may not be used as reference pictures, as is the case for the example shown in FIG. 6.

Figure 7:
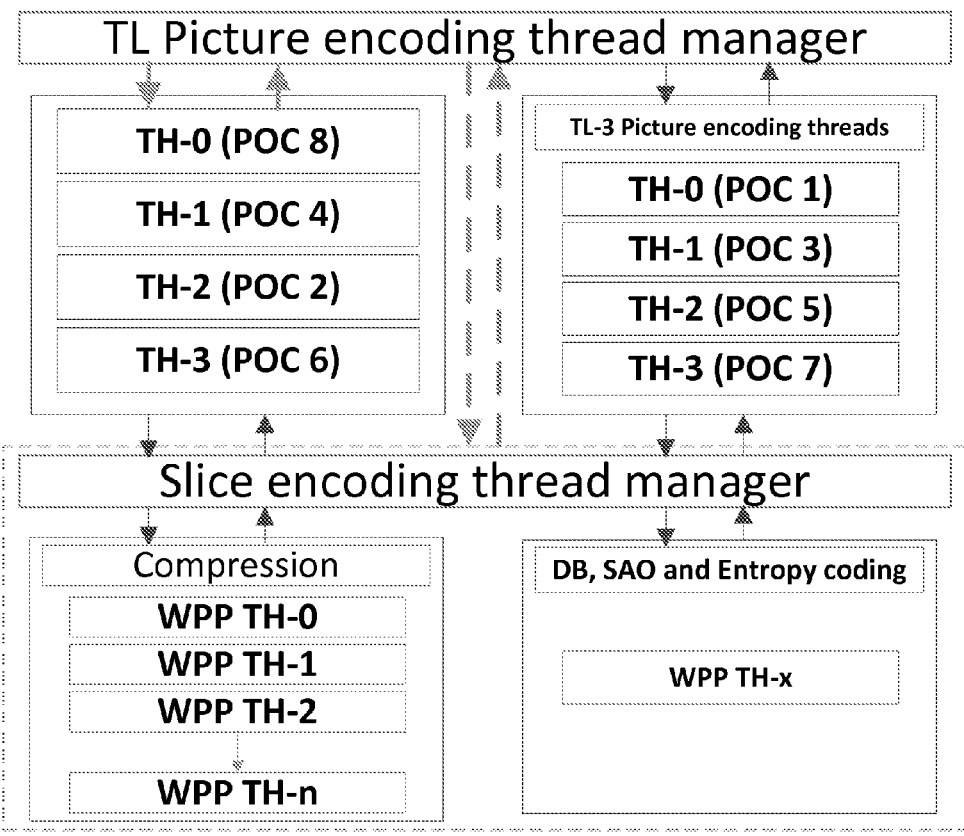
FIG. 7 shows an example architecture for a multi-level, multi-threaded parallel processing framework for HEVC encoding.
Figure 8:
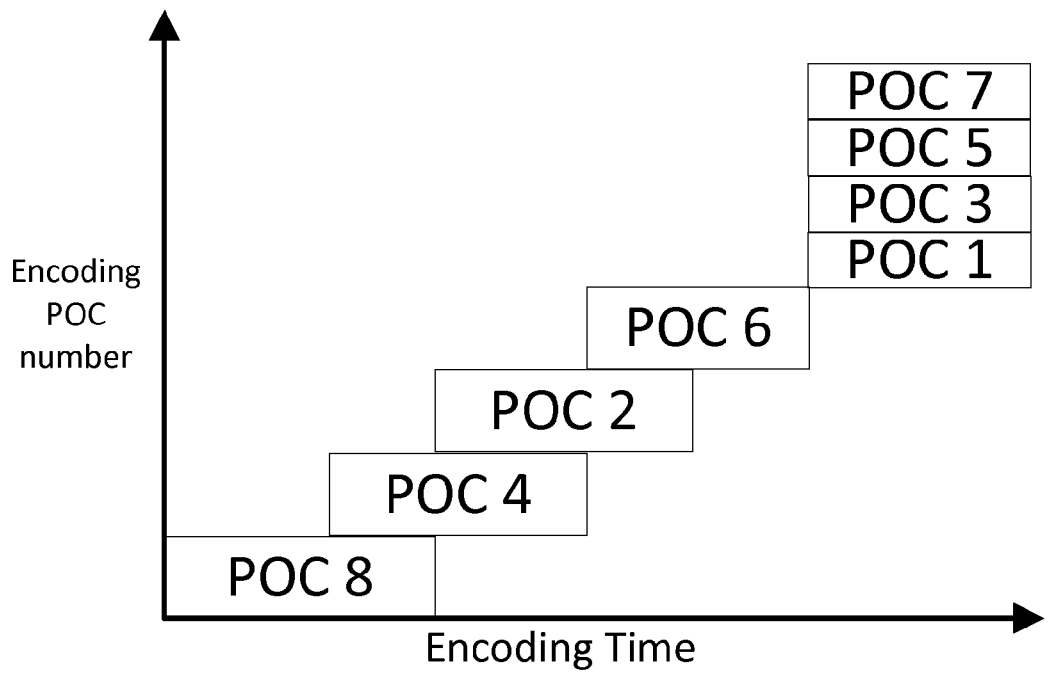
FIG. 8 shows an example of picture encoding order for a multi-threaded framework.

FIG. 7 shows an example architecture for a multi-level, multi-threaded parallel processing framework for HEVC encoding. FIG. 8 shows an example of picture encoding order for a multi-threaded framework. As depicted on FIG. 6, pictures having the non-lowest priorities (e.g., POCS 0, 2, 4, 6, and 8) may be grouped together, and pictures having the lowest priorities (e.g., POCS 1, 3, 5, and 7) may be grouped together. For illustration purposes, the pictures having the lowest priorities may be denoted as temporal level 3 (TL_3). For example, temporal level 3 pictures may include non-reference pictures. A picture that is not referenced by another picture may belong to temporal level 3.

Figure 9:
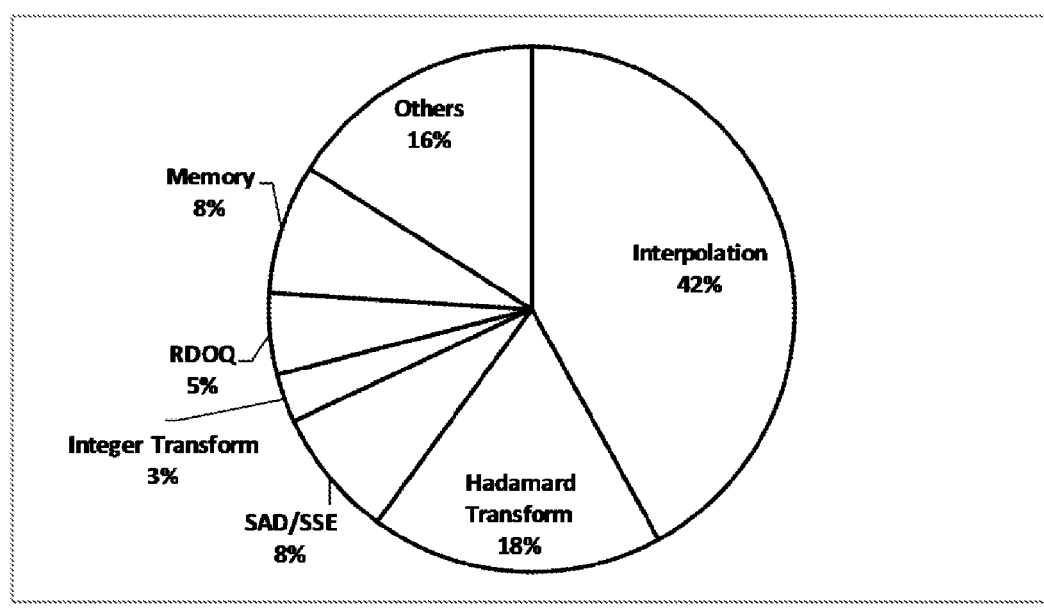
FIG. 9 shows an example of profiling results in terms of encoding time as a percent of overall encoding time for HEVC reference encoder HM-12.0.

FIG. 9 shows an example of profiling results in terms of encoding time as a percent of overall encoding time for HEVC reference encoder HM-12.0. Profiling results are shown for various modules in the encoding process, including interpolation, SAD (integer motion estimation), Hadamard Transform (fractional motion estimation), SSE (distortion calculation using Sum of Squared Errorin RDO based mode decision, inverse transform etc. Profiling is based on full HD (1920×1080) encoding carried out on an Intel quad core i7 CPU. Profiling results indicate that interpolation, Hadamard transform, SAD, SSE, and integer transform are the most time consuming encoding modules. One or more of these modules may be optimized using Streaming SIMD Extension (SSE) 4.1 instructions. SIMD instructions may use 128-bit registers, e.g., instead of 32-bit registers, for operations to improve encoding speed. In an example using an SIMD optimization technique, overall encoder speed improved by 46-50%.

A multi-level multi-threaded parallel processing framework may be applied at picture level and/or a slice level. Multi-threaded parallel processing framework using WPP technology may be applied, for example, to process a CTU row of a slice/picture in parallel. Picture/frames may be categorized into multiple levels, such as two, three, four or the like, levels.

Multi-threaded processing may be applied within one slice using WPP methodology. A parallelization scheme may exploit CTU-row level parallelism. A slice encoding thread manager may be responsible for creating a number of CTU-row compression threads (WPP threads). A thread may perform compression of a CTU row in a slice. WPP methodology may be used to enable an individual/independent entropy coder for a CTU row. With WPP enabled, a CABAC entropy coder for a current CTU row may be initialized, for example, based on the CABAC entropy coder's status after the first two CTUs of the CTU row above the current row are encoded.

In an example, eight (8) CTU row encoding threads, which is equivalent to the number of hyper threads available in a quad core i-7 CPU, may be used to encode eight (8) CTU rows of a slice in parallel. Note, however, that the use of 8 CTU rows is a non-limiting example and is used for illustrative purposes only. Further, an ideal encoding system has no dependency among CTU row encoding threads. In an example implementation of an encoder, there may be several types of delay, e.g., a CABAC initialization delay and a motion delay.

Figure 12B:
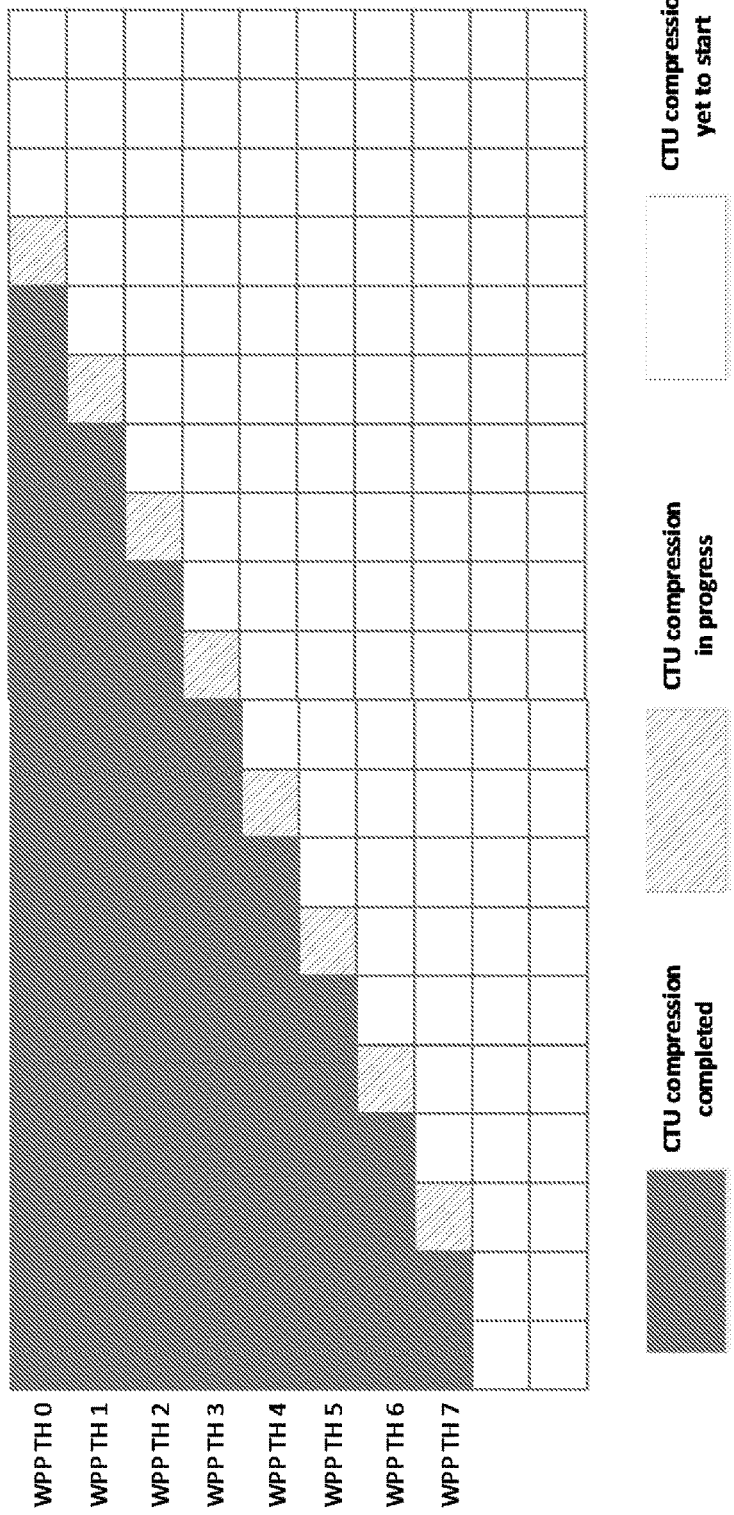
FIG. 12B shows an example of motion dependency using WPP methodology.

FIGS. 12A and 12B show, respectively, examples of CABAC dependency and motion dependency using WPP methodology. Encoding time of a frame is given by Eq. 1.

$$T_{Anchor} = W * H * \Delta \qquad \text{Eq. 1}$$

In Eq. 1, $\Delta$ is an average time to encode a CTU, W is the number of CTUs in a CTU row and H is the number of CTU rows in the picture. Encoding time for a frame is given by Eq. 2, for example, when WPP is used with N WPP threads to encode a picture.

$$T_{WPP} = \frac{W * H * \Delta}{N} + T_{CABAC\_Delay} + T_{Motion\_Delay} \qquad \text{Eq. 2}$$

$$T_{CABAC\_Delay} = [2 * \Delta * (N - 1)] * \frac{H}{N}$$

Motion delay of a CTU at the i-th row and the j-th column may be calculated according to Eq. 3, for example, when two WPP threads are used for compression.

$$\Delta t_{i,j} = \text{DELAY}(T_{i-1,j+1}, T_{i,j-1}) \qquad \text{Eq. 3}$$

$$\text{DELAY}(T0, T1) = \begin{cases} 0, & (T0 - T1) < 0 \\ T0 - T1, & (T0 - T1) \geq 0 \end{cases}$$

Motion delay of a CTU at the i-th row and j-th column may be calculated according to Eq. 4, for example, when N threads are used.

$$\Delta t_{i,j} = \text{DELAY}(T_{i-1,j+1} + \Delta t_{i-1,j+1}, T_{i,j-1}) \qquad \text{Eq. 4}$$

Motion delay for processing a whole picture may be calculated according to Eq. 5.

$$T_{Motion\_Delay} = \left( \sum_{i=1}^{N} \sum_{j=1}^{W-2} \Delta t_{i,j} \right) * \frac{H}{N} \qquad \text{Eq. 5}$$

Motion delay time may increase as the number of threads increases, for example, because a CTU compression may depend on CTU compression for a previous row.

Figure 13:
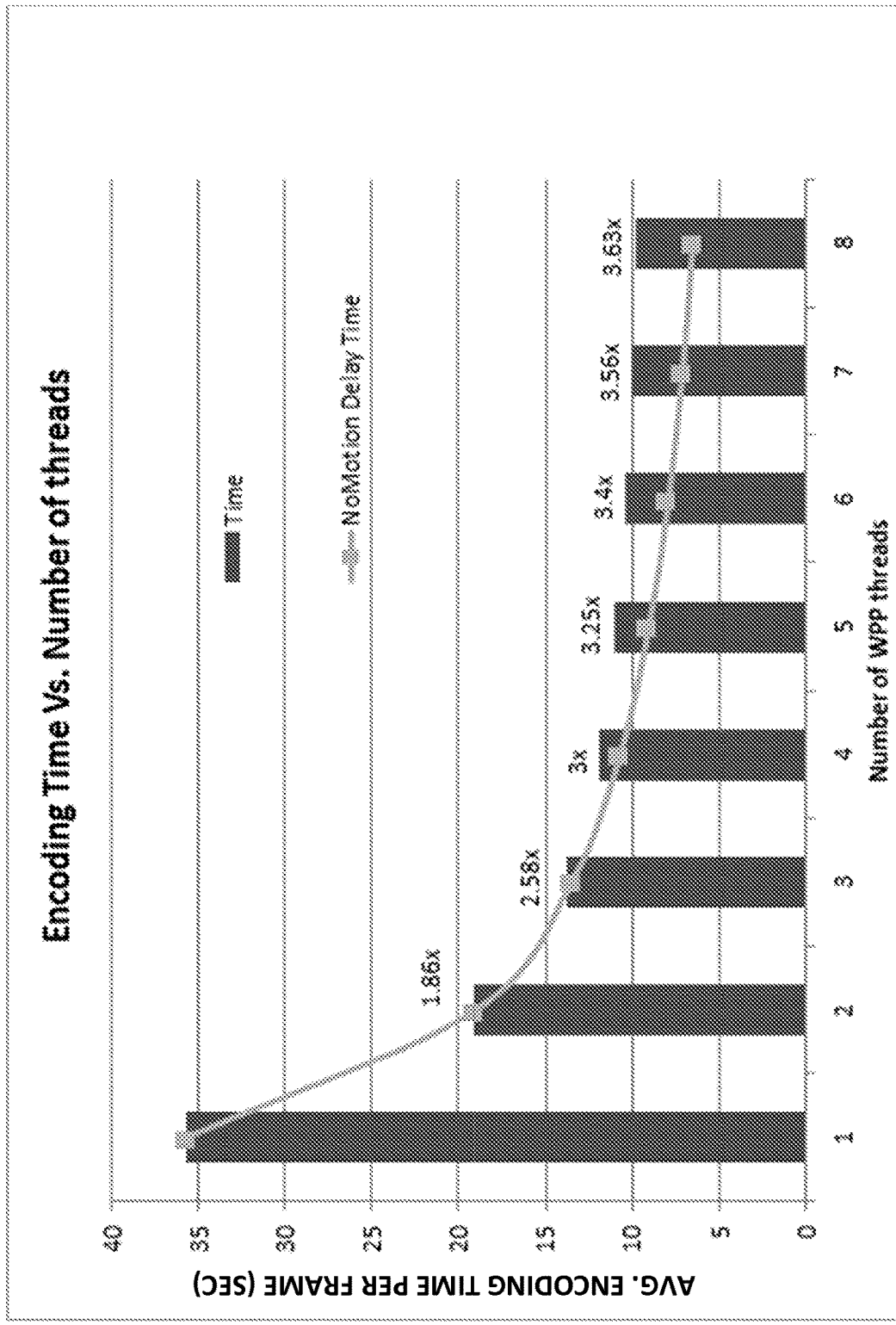
FIG. 13 shows an example of average encoding time per frame based on a number of WPP threads in an example encoder.

FIG. 13 shows an example of the average encoding time per frame based on a number of WPP threads in an example encoder. Each bar and corresponding curve represents a comparison of encoding in real time mode (e.g., each bar) without a motion delay time (e.g., each theoretical curve). In the example shown in FIG. 13, a test bitstream is a BasketballDrive sequence coded with quantization parameter (QP) 28. Parameters used in the example encoder comprise BasketballDrive 1920×1080 QP 28 on an Intel I-7 2600 CPU with 4 core (8 Threads).

The curve in FIG. 13 shows a theoretical encoding time without motion delay, e.g., with $T_{Motion\_Delay}$ in Eq. 5 set to zero, and average CTU encoding time $\Delta$ estimated from encoding time without WPP. In other words, the curve describes the theoretical relationship between encoding time and number of threads if motion delay does not exist while bars account for motion delay. The bars in FIG. 13 show average encoding time, per picture, using a number of WPP threads measured using a WPP technique. As shown in FIG.

13, a rate of reduction in encoding time may substantially decrease with additional throughput (e.g. additional threads assigned to the same picture), for example, when more than four WPP threads are used for a compression process. This effect may be referred to as a "throughput saturation" effect.

FIG. 13 shows that the first three bars such as bars 1, 2, and 3 closely track the theoretical encoding time curve without motion delay. However, as depicted on FIG. 13, as the number of WPP threads increases beyond three, the rate of reduction in encoding time is slower than the theoretical rate of reduction without motion delay. This difference in rate of decrease in decoding time may be observed by the increasing gap between the top of each respective bar and the curve as the number of WPP threads increases beyond three.

Further, motion dependency may reduce HEVC encoder throughput as the number of WPP encoding threads increases, for example, because CTU encoding may become unbalanced. Motion delay may be reduced by balancing a CTU encoding, e.g., for the top left part of the slice. An encoder may apply a complexity control technique for a top left part of a slice. An encoder may terminate a motion estimation process early, for example, when a number of check points in motion estimation exceeds a threshold such as 3, 4, 5, or the like.

Parallel processing using a multi-threaded framework may be applied to a group of pictures (GOP) in multiple stages (e.g., two stages).

The number of threads for coding (e.g., encoding and/or decoding) the second-temporal level pictures may be zero before coding of the first-temporal level pictures is completed. The number of threads coding the first-temporal level pictures may become zero after completing the coding of the first-temporal level pictures. In an example, threads (e.g., parallel processing threads) may be evenly distributed among the second-temporal level pictures. In other examples, however, threads may be distributed unevenly among the first-temporal level pictures (e.g., based on picture priority).

For example, in a first stage, parallel processing may be applied for temporal level 0 (TL-0), temporal 1 (TL-1), and temporal 2 (TL-2) pictures. POCS 8, 4, 2, and 6 may be encoded in parallel. As an example, threads may be allocated to a picture within a temporal level, based on the amount of times other pictures reference the picture.

In a second stage, temporal level 3 (TL-3) pictures may be coded. For example, TL-3 pictures, such as POC 1, POC 3, POC 5 and POC 7, e.g., in a random access main configuration of HEVC encoding, may lack dependency among themselves but may have dependency on non TL-3 pictures. For example, POC 8, POC 4, POC 2, POC 6, and POC 0 may be used as reference pictures to encode TL-3 pictures. Parallel processing may be applied for the four lowest priority pictures (POC 1, POC 3, POCS, and POC 7). POC 1, 3, 5 and 7 may be encoded in parallel. WPP encoding threads may be allocated to TL-3 pictures evenly, for example, when there is no dependency among TL-3 pictures. The four TL-3 pictures may be processed in parallel with four picture level encoding threads. A picture thread (e.g. each of the four picture level encoding threads) may use WPP threads internally to encode a respective picture. In an example, original pixels may be used for motion estimation, e.g., to remove motion search dependency for temporal level 0, 1 and 2 pictures. In an example, reconstructed pixels may be used for motion estimation.

Picture level parallel processing may be applied to TL-3 pictures using multi-threaded parallel processing framework, for example, after TL-0/1/2 picture encoding in a first stage completes. Loop filter and motion search region dependency limitations may be reduced or avoided when using an OWF technique.

An example of the multi-threaded framework is shown on FIG. 7, wherein picture-level thread 0 (e.g., TH-0) may be applied to POC 8 in a first stage and to POC 1 in a second stage; picture-level thread 1 (TH-1) may be applied to POC 4 in a first stage and to POC 3 in a second stage; picture-level thread 2 (TH-2) may be applied to POC 2 in a first stage and to POC 5 in a second stage; and picture-level thread 3 (TH-3) may be applied to POC 6 in a first stage and to POC 7 in a second stage. Picture-level threads (TH-0/1/2/3) may manage WPP threads. WPP threads may process one CTU row. In a second stage, WPP threads may be distributed equally for the picture-level threads (TH-0/1/2/3). In a first stage, WPP threads may be distributed dynamically among picture-level threads. For example, N WPP threads may be assigned (e.g., successively assigned) to the first picture in coding order, POC-8, then N WPP threads may be assigned (e.g., successively assigned) to the second picture in coding order, POC-4, and/or according to picture coding order (e.g. as illustrated in FIG. 8, or FIG. 11). These assignments of WPP threads to non-TL_3 pictures may be done dynamically, based on the availability of WPP threads, and/or based on the clearing of dependencies for CTU rows.

FIG. 10 shows an example of an encoding order for an HEVC encoder with random access main configuration. The order shown in FIG. 10 may be used in HM reference software. FIG. 11 shows an example of a modified encoding order for an HEVC encoder with random access main configuration. FIG. 11 shows the pictures having the lowest priority (e.g., POC 3, POC 5, and POC 7), each found in TL_3, being ordered last.

A multi-threaded framework may create a temporal level picture encoding thread manager at a top level encoding. A thread manager may be responsible for creating and managing threads to encode TL-3 pictures in parallel. In an example, a TL-3 encoding thread may be in charge of one TL-3 picture encoding process. The temporal level picture encoding thread manager may synchronize an encoding process between encoding of TL-0/1/2 pictures in a first stage and encoding of TL-3 pictures in a second stage.

In an example using multi-threaded encoding and a picture processed using one WPP thread, a 23-25% improvement was achieved in encoder speed in comparison to HEVC reference encoder HM-12.0.

Slice compression of a picture may be performed with a dynamic number of WPP threads. In an example, an i-7 quad core processor may be used for encoder profiling in a multiple picture parallel encoding technique. A WPP encoding process of non-TL-3 pictures may be configured to use 8 WPP threads and TL-3 pictures may be configured to use 2 WPP threads so that 8 WPP threads (e.g., 4 TL-3 Pictures threads*2 WPP threads/picture) are operated during the entire process of encoding the TL-3 pictures.

In an example, a 5-10% encoder performance improvement is achieved in comparison to a parallel encoding (WPP) technique using eight WPP threads for a slice/picture encoding. Performance improvement on an Intel i-7 quad core processor may be limited due to the number of CPU cores.

Figure 14:
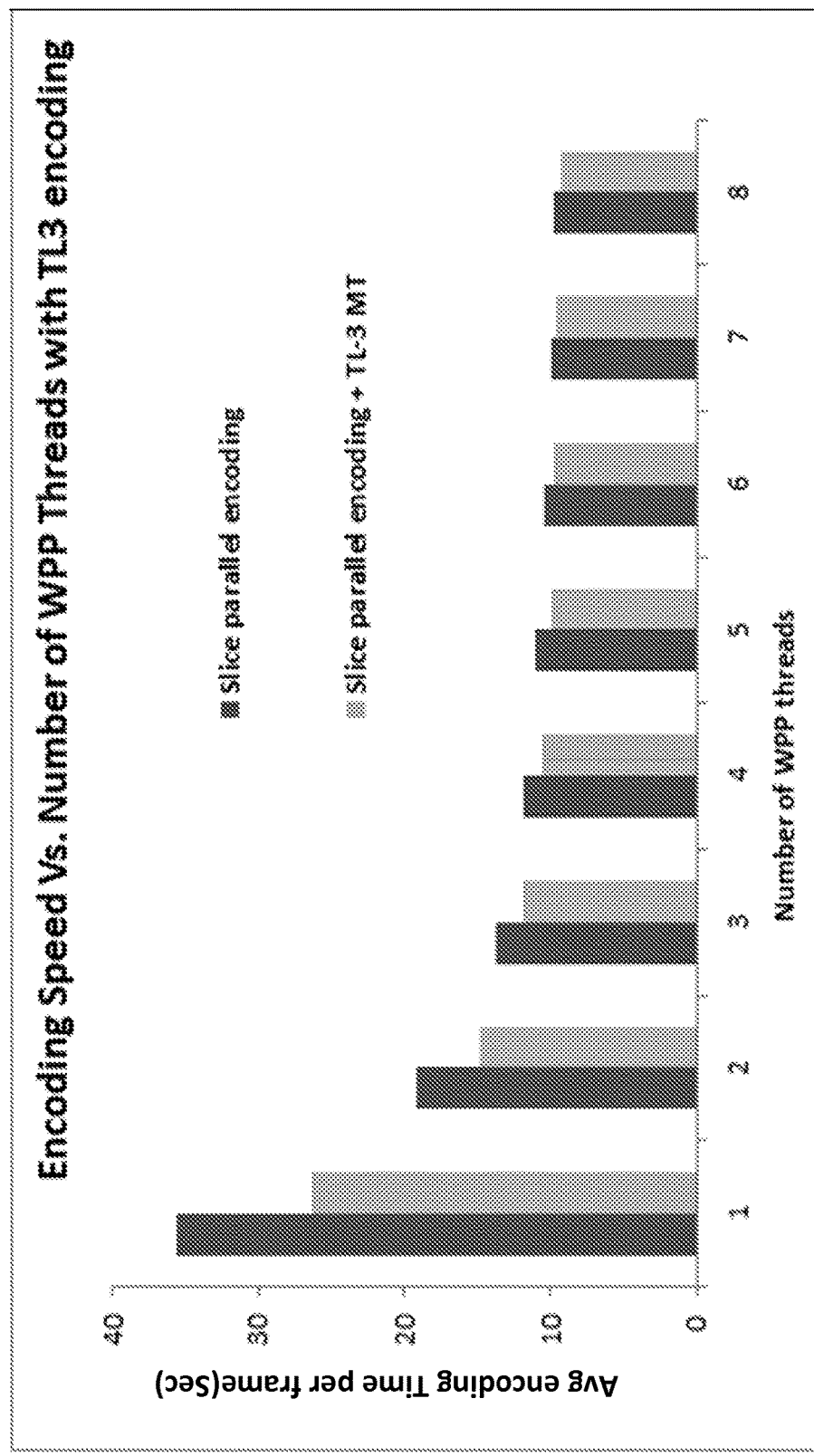
FIG. 14 shows an example of average encoding time per picture using a number of WPP threads in example encoders, comparing average encoding time for slice parallel encoding with WPP threads to slice parallel encoding with WPP threads combined with multi-thread processing of temporal level 3 (TL-3) pictures.

FIG. 14 shows an example of the average encoding time per picture using a number of WPP threads in example encoders, comparing average encoding time for slice parallel encoding with WPP threads to slice parallel encoding with WPP threads combined with multi-thread processing of TL-3 pictures. Parameters used in the example encoder comprise BasketballDrive 1920×1080 QP 28 on an Intel I-7 2600 CPU with 4 core (8 Threads). N may denote as the number of WPP threads, as shown in FIG. 14. In an example, the combined technique uses N WPP threads for TL-0/1/2 picture encoding, 1 WPP thread per TL-3 picture when N is less than or equal to 4, and 2 WPP threads per TL-3 picture when N is more than 4. A combined technique may be faster regardless of the number of threads, but the margin of improvement may decrease as the number of threads increases.

Pictures of a temporal level may be coded (e.g., encoded and/or decoded) in parallel using a number of the parallel processing threads allocated for that temporal level. Parallel processing using a multi-threaded framework may be applied, for example, to pictures at lower temporal levels such as TL-0/1/2. There may be strong dependencies among TL-0, TL-1 and TL-2 pictures. In some examples, WPP threads may be allocated evenly among pictures of a temporal layer. In other examples, however, WPP threads may not be allocated evenly. Encoding threads may be allocated dynamically to improve encoding speed. For example, the threads may allocated based on round robin scheduling, priority scheduling, lottery scheduling, and/or others.

Figure 18A:
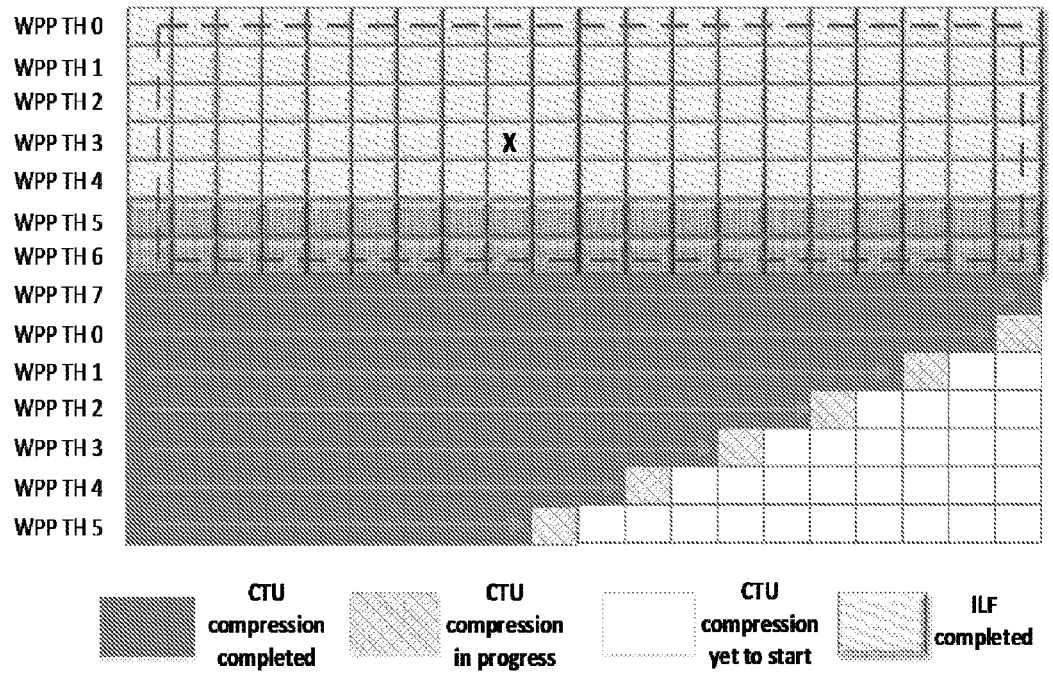
FIG. 18A shows an example of a reference picture encoding status.
Figure 18B:
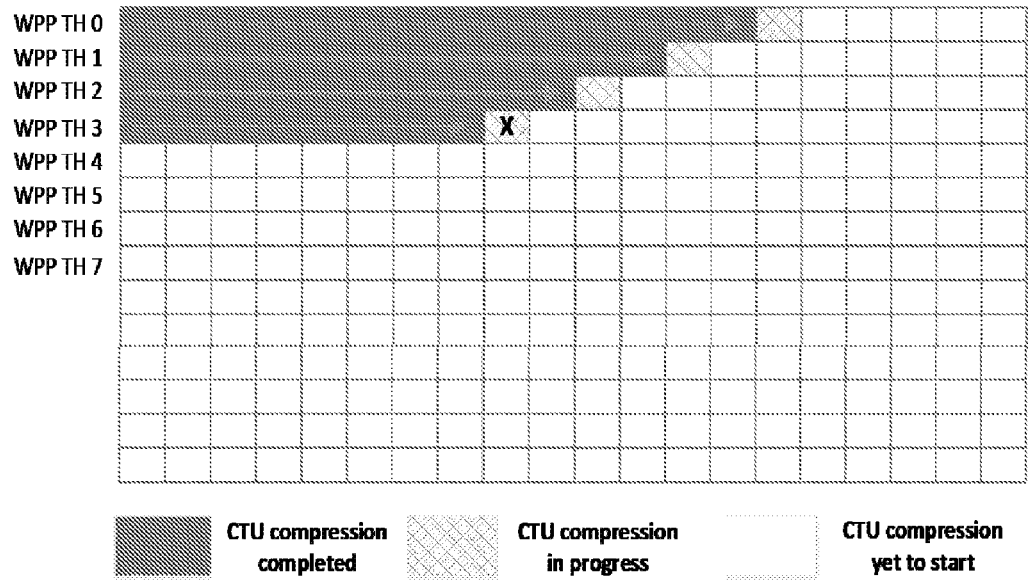
FIG. 18B shows an example of a current picture encoding status.

Multi-threaded processing of TL-0, 1 & 2 pictures (e.g., inter frame parallel processing) may be performed. For example, an OWF parallel processing technique may be used to encode pictures of a high priority temporal layer using multi-threaded parallel processing. A multi-threaded parallel processing framework's high priority temporal layer (e.g., non-TL3) picture encoding thread manager may initiate encoding of a first picture. Other threads responsible for encoding other pictures may be waiting for completion of Sample Adaptive Offset (SAO) processing of coding tree units (CTUs) within motion search range in their respective reference pictures. For example, FIG. 18B shows an example of current picture encoding status while FIG. 18A shows reference picture encoding status.

Slice encoding thread manager may signal to the next picture encoding process that it may start encoding, for example, after the current picture (which may be a reference picture for the next picture) completes loop filter processing (e.g., deblocking and/or SAO) for CTUs within search range.

Sequential processing of slice compression, deblocking (DB) and SAO processing may be used. FIG. 15 shows an example of sequential processing of slice compression 1502, deblocking 1504 and SAO processing 1506. Sequential processing may make it more difficult to achieve faster encoding with an OWF parallel processing technique. A sequential encoding processing shown in FIG. 15 may be modified, for example, as shown in FIG. 16.

FIG. 16 shows an example of parallel processing of slice compression 1602, loop filtering (e.g., deblocking) 1604 and SAO processing 1606 based on CTU row. Deblocking 1604 and SAO processes 1606 may be executed for a CTU row. CTU compression 1602, Deblocking 1604 and SAO processes 1606 may be performed in parallel.

An SAO process 1606 may be performed for a CTU row, for example, after completion of deblocking process for the CTU row. This process may be repeated for a picture. CTU encoding status may be updated to the next picture's CTU compression threads through slice encoding thread manager, for example, after completion of a loop filtering process of a CTU row in a current picture. Synchronization overhead may be reduced on a next encoded picture's CTU compression threads.

Figure 17:
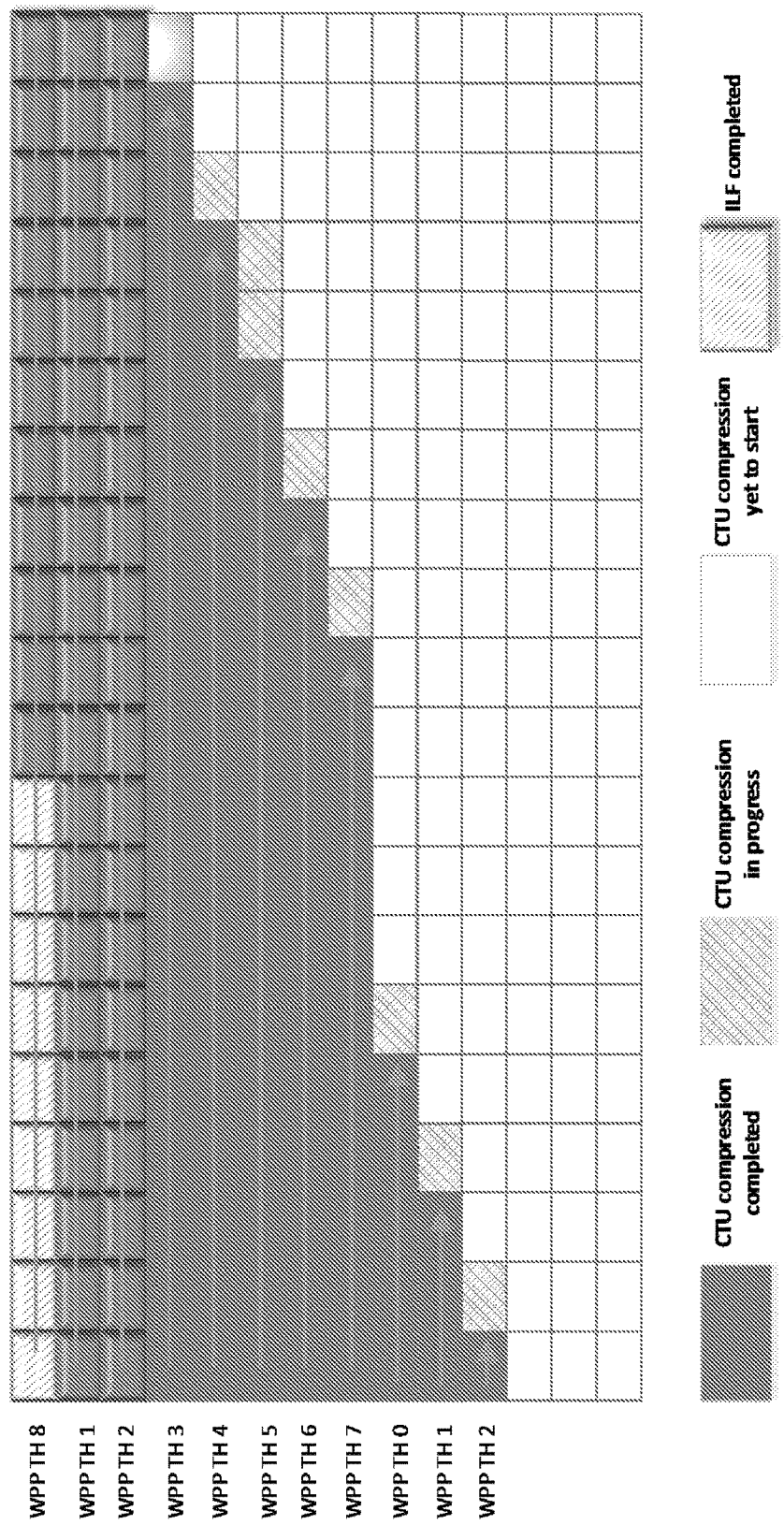
FIG. 17 shows an example where a loop filtering (deblocking and SAO) process may start after CTU compression of the first 3 CTU rows are completed.

Picture level parallel processing with thread management may be referred to as inter picture wave-front parallel processing (IPWPP) herein. An example of the IPWPP encoding process is shown in FIGS. 17 and 18. Referring to FIG. 17, a loop filtering (e.g., deblocking and SAO) process may start after CTU compression of the first 3 CTU rows are completed. Loop filtering may operate in parallel with CTU compression threads thereafter. An example of dependency between CTUs for a current picture and CTUs for a reference picture is shown in FIGS. 18A and 18B.

FIG. 18B shows an example of a current picture encoding status and FIG. 18A shows an example of a reference picture encoding status. In an example, a search window size may be 128×128. In FIG. 18B, CTU row X in the current picture may start compression, for example, when pixels within its search range in the reference picture (indicated as blocks marked by a dashed rectangle) have completed compression and in-loop filtering (ILF) shown in FIG. 18A.

Figure 22:
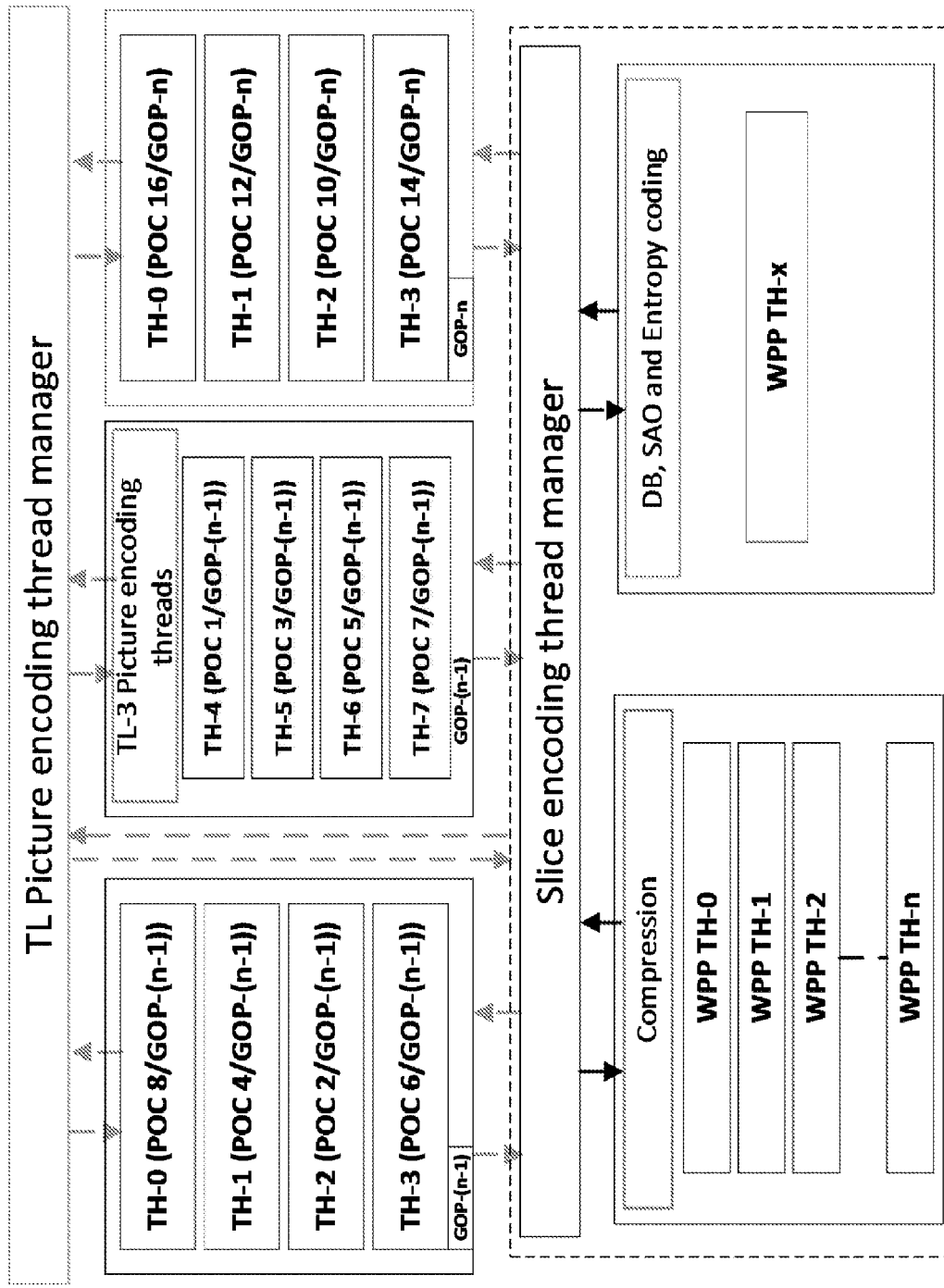
FIG. 22 shows an example of a multi-GOP encoding architecture.

IPWPP may be used, for example in combination with other techniques, e.g., TL-3 WPP multi-threaded parallel processing, to encode multiple groups of pictures. FIG. 22 shows an example of a multi-GOP encoding architecture. As shown on FIG. 22, non-TL_3 pictures (e.g., first-temporal level pictures), including POCs 8, 4, 2, and 6 may belong to a same group (e.g., GOP-(n-1)) as TL_3 pictures (e.g., second-temporal level pictures), including POCs 1, 3, 5, and 7. In an example, the TL_3 pictures (e.g., POC 1, 3, 5, and 7) denoted within a first GOP (e.g. GOP-(n-1)) may be processed in parallel with non-TL_3 pictures (e.g., POC 16, 12, 10, and 14) denoted within a second GOP (e.g., GOP-n). In an example, the TL_3 pictures (e.g., POC 1, 3, 5, and 7) within the first GOP (e.g. GOP-(n-1)) may be processed in parallel with the non-TL_3 pictures (e.g., POC 16, 12, 10, and 14) of the second GOP (e.g., GOP-n), after encoding of at least a portion of the non-TL_3 pictures (e.g., POCs 8, 4, 2, and 6) of the first GOP (e.g., GOP-(n-1)) has completed.

IPWPP may use efficient signaling between WPP threads of current and next encoding pictures. Synchronization overhead between WPP threads may be minimized. WPP thread scheduling may be implemented to utilize maximum CPU capabilities. The effect of throughput saturation, which may be due to CABAC and motion vector prediction dependencies, may be reduced. Efficient thread scheduling may be utilized to achieve maximum CPU capabilities for TL-0/1/2/3 picture encoding.

Free WPP threads from a current picture may be assigned to a next picture encoding, for example, after allocating the current picture CTU rows for compression. WPP threads may be scheduled for next picture encoding. For example, whether to allocate threads for coding a next picture may be determined based on the coding complexity of the current picture, the coding complexity of the next picture, and/or the effect of throughput saturation.

Thread management for parallel encoding of pictures within a GOP may be performed. The example results shown in FIGS. 13 and 14 indicate that reduction in encoding time by increasing throughput may saturate. For example, an implementation using more than six WPP threads may not significantly improve encoding speed. Intel i7 quad core CPU capabilities may not be fully exploited, for example, for one or more reasons (e.g., CABAC and motion dependency). CTU encoding threads may be scheduled, for example, so that a light weight thread starts deblocking and SAO processing for the current picture after completing a compression process for two CTU rows. There may be dependency between compression and deblocking, e.g., as shown in FIG. 17. The actual number of CTU rows affected by motion dependency may depend, for example, on the motion search range and the CTU block size. For example, assume the search range is 128×128 and CTU is 64×64. Motion dependency may cause delays of two CTU rows.

In an example, a next picture encoding process may start after the current picture completes loop filtering of three CTU rows. The additional CTU row delay may occur. A compression process for a current picture CTU row X may start, for example, after reference picture CTU row X and (X+1) deblocking and SAO is completed. Reconstructed pixels from row (X+2) in reference picture may be needed to complete deblocking and SAO of row (X+1) in reference picture. Accordingly, there may be a three CTU row delay between the current picture and the reference picture, based on the assumption of a 128×128 search range and a 64×64 CTU size.

One or more WPP threads from a current picture compression may be allocated or assigned to process the next picture compression. The number of threads scheduled for next picture processing may depend, for example, on the next picture encoding complexity. TL level may indicate complexity. For example, a lower TL (e.g., TL-0 or TL-1) picture encoding complexity may be higher than encoding complexity of a higher TL (e.g., TL-2) picture.

The number of threads to be allocated to a next picture may be determined based on a number of maximal WPP threads used for coding a picture, the estimated encoding time of current picture, and/or the estimated encoding time of next picture. The number of WPP threads considered for thread switching from the current picture to the next picture may be estimated in accordance with Eq. 6, for example, after estimating current and next picture encoding complexity.

$$N_{Switch\_Threads} = \max(1, Int(\gamma * N_{Maximal\_Threads})) \quad \text{Eq. 6}$$

In Eq. 6, $N_{Switch\_Threads}$ is the number of WPP threads switched to next picture encoding, $N_{Maximal\_Threads}$ is the number of maximal WPP threads used for one picture encoding and γ is the thread switching factor. Thread switching factor γ may be calculated based on the relative encoding complexity of the current picture and the next picture, for example, in accordance with Eq. 7.

$$\gamma = \begin{bmatrix} 0.10 & \text{if } \frac{T_{Next}}{T_{Curr}} \leq 0.6 \\ 0.25 & \text{if } 0.6 < \frac{T_{Next}}{T_{Curr}} \leq 0.8 \\ 0.40 & \text{if } 0.8 < \frac{T_{Next}}{T_{Curr}} \end{bmatrix} \quad \text{Eq. 7}$$

In Eq. 7, $T_{Curr}$ is the estimated encoding time of current picture and $T_{Next}$ is the estimated encoding time of next picture.

A CTU encoding thread switch may happen after $W_{CompressedCTURows}$ number of CTU rows in the current picture are completed, for example, in accordance with Eq. 8.

$$W_{CompressedCTURows} = W_{MaxCTURows} * \lambda \quad \text{Eq. 8}$$

In Eq. 8, λ factor can be chosen, for example, in accordance with the limitation in Eq. 9.

$$0.4 \leq \lambda \leq \max\left(0.4, \frac{W_{MaxCTURows} - \left(N_{Maximal\_Threads} * \frac{T_{Next}}{T_{Curr}}\right)}{W_{MaxCTURows}}\right) \quad \text{Eq. 9}$$

WPP threads may be shared (e.g., shared equally) among multiple TL-3 pictures, for example, after completing temporal level 0, 1 and 2 pictures. A picture may use, for example, two WPP threads for slice compression.

Figure 19:
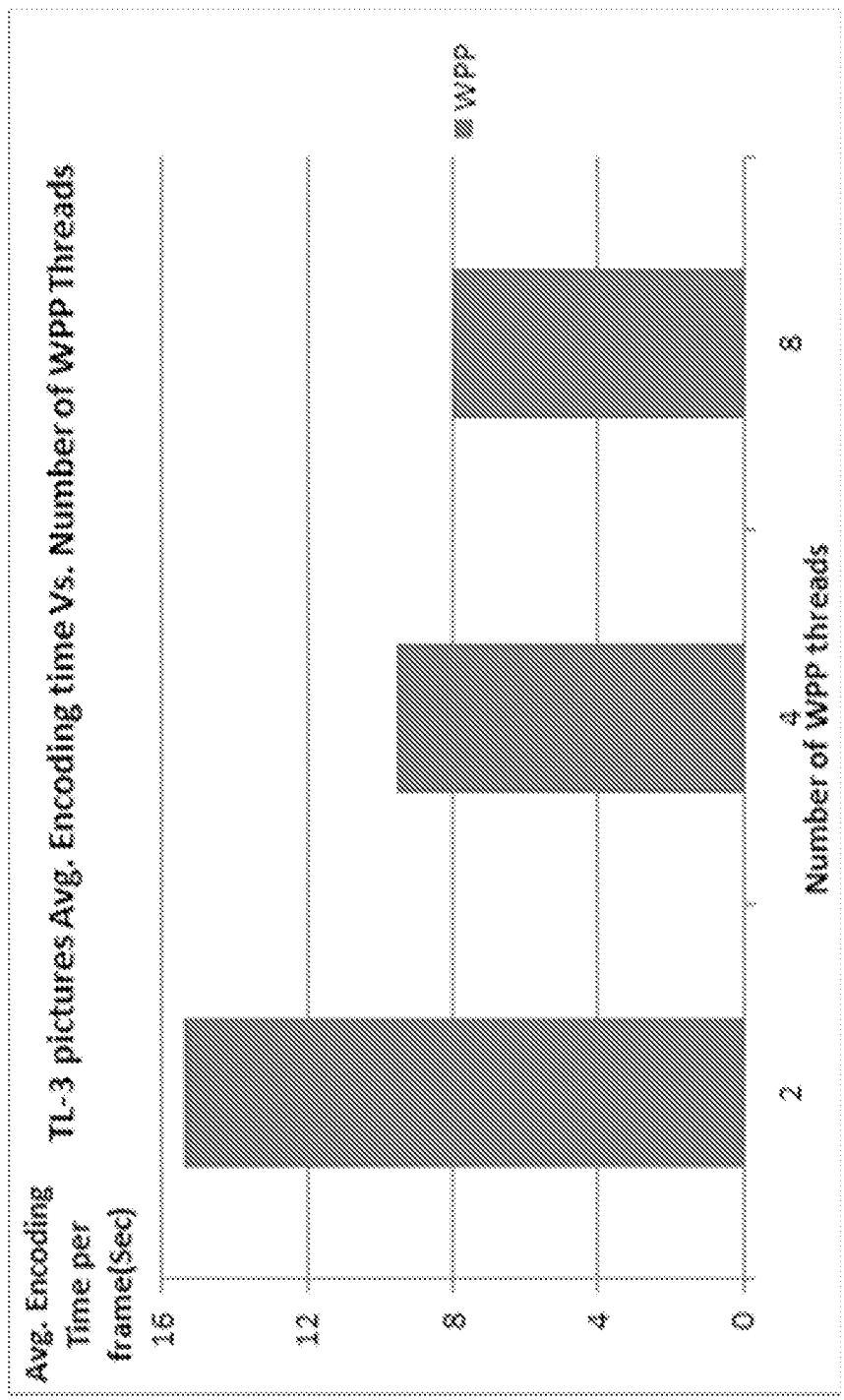
FIG. 19 shows an example of average encoding time for TL-3 pictures for a number of WPP threads.

WPP threads may be scheduled for TL-3 picture encoding to improve encoding performance. FIG. 19 shows an example of average encoding time for TL-3 pictures for a number of WPP threads. One or more additional WPP threads may be assigned to a TL-3 picture when more CPU cores are available. FIG. 19 compares performance of an optimized HEVC encoder using 2, 4 and 8 WPP threads for TL-3 picture encoding. For example, as shown in FIG. 19, a 1.614 multiple performance improvement may be achieved using four WPP threads for a TL-3 picture relative to using two WPP threads. As shown, WPP threads may be scheduled for TL-0/1/2 picture encoding to improve encoding performance.

Figure 20:
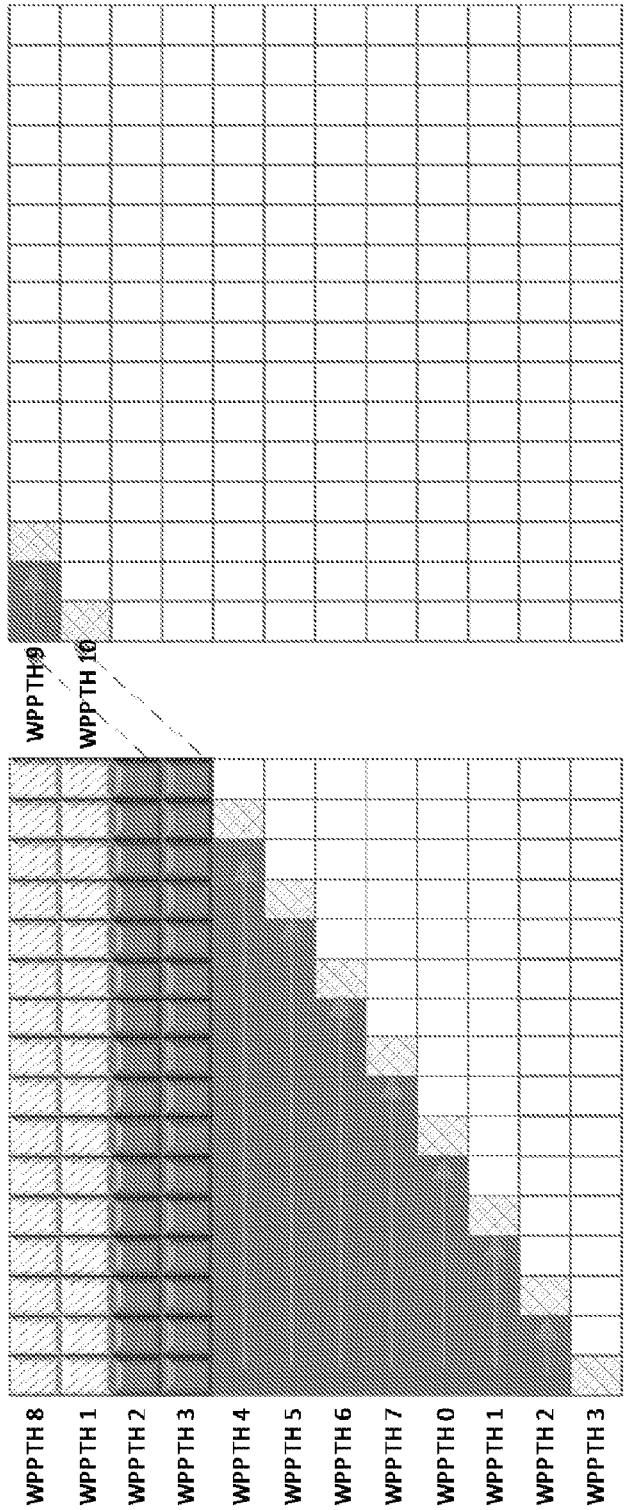
FIG. 20 shows an example of scheduling WPP threads for TL-0/1/2 pictures and scheduling new threads for next picture encoding.
Figure 20:

Inter picture wavefront parallel processing may be used to code TL-0/1/2 pictures in parallel. WPP scheduling may be accomplished by a variety of different techniques. FIG. 20 shows an example of scheduling WPP threads for TL-0/1/2 pictures and scheduling new threads for next picture encoding. A slice compression process may start using a preselected number of WPP threads (e.g., 8 WPP threads). The number of threads may be less than a maximum number of available threads.

As shown in FIG. 20, a next picture slice compression may be started with a new WPP thread (WPP TH 9), for example, after SAO processing of three CTU rows. A new WPP thread, for example WPP TH 10, may be initiated for processing the next available CTU row in next picture and current WPP thread may start processing the next available CTU row compression in the current picture, for example, as soon as a WPP thread completes the processing of one CTU row. Limiting the number of WPP threads used for encoding of a picture (e.g., 8 WPP threads in FIG. 20) to less than the maximum number of available threads may permit scheduling more threads for processing of a next picture while current picture encoding is in progress.

Figure 21:
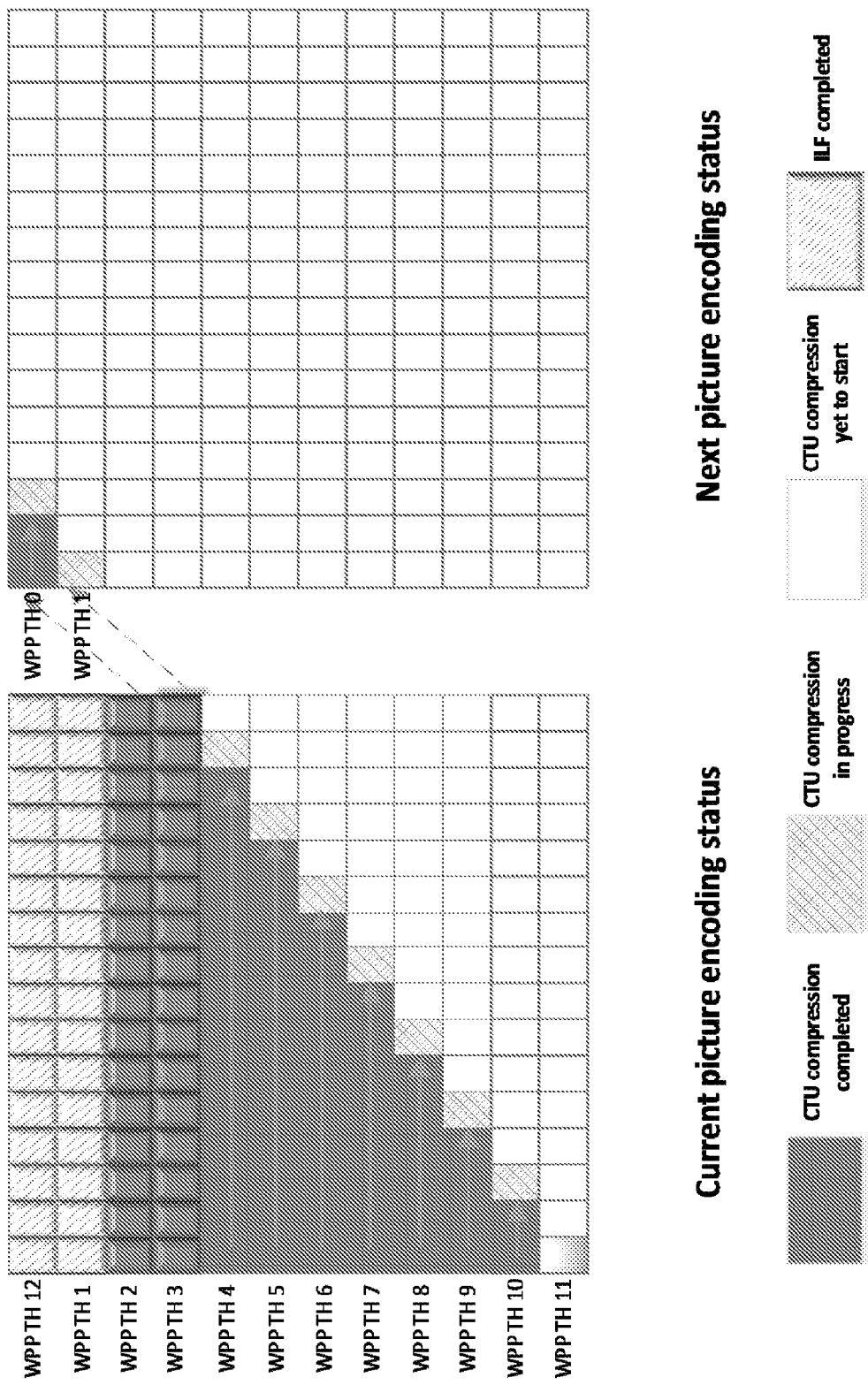
FIG. 21 shows an example of scheduling WPP threads for TL-0/1/2 pictures and reusing the threads for next picture encoding.

FIG. 21 shows an example of scheduling WPP threads for TL-0/1/2 pictures and reusing the threads for next picture encoding. Compared to an example shown in FIG. 20, an example shown in FIG. 21 may focus more on encoding a current picture.

A slice/picture compression process may start, for example, by using a maximum number of WPP threads. For example, a maximum number of WPP threads may be calculated based on a minimum number of available CPU cores or a minimum number of CTU rows in slice. Next picture slice compression may be started using the existing WPP thread (WPP TH 0), for example, after SAO processing of three CTU rows. A WPP thread (e.g., WPP TH 3) that completes processing of one CTU row process (e.g., WPP TH 3) may, for example, be reused for processing the next available CTU row in current picture or the next available CTU row in the next picture, for example, when encoding of CTU rows in the current picture has either completed or is being processed by a thread.

An encoder may determine the dependencies in a GOP, for example, by pre-analysis. Pre-analysis may be implemented, for example, by a look-ahead or based on pre-set configurations.

Figure 26A:
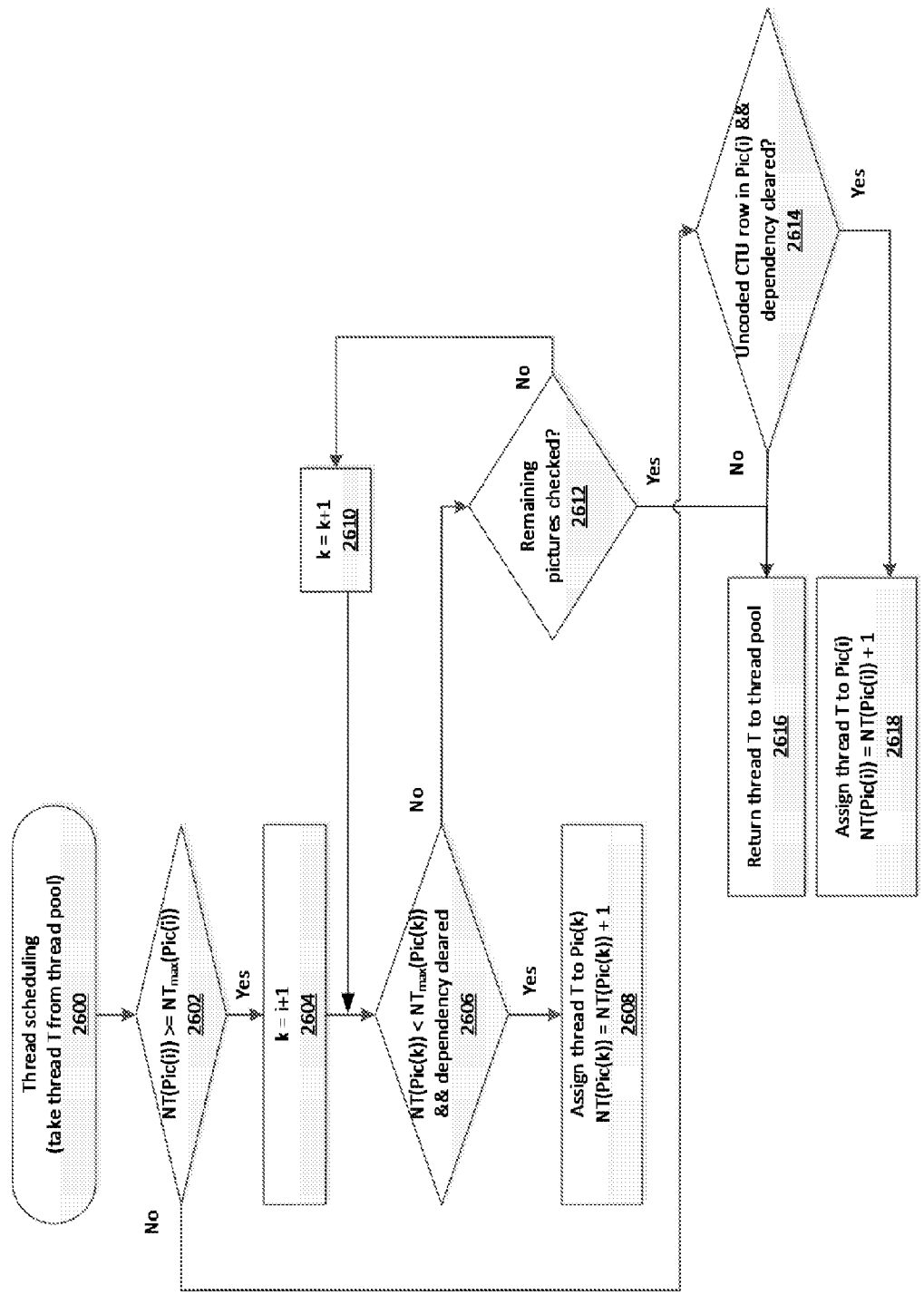
FIG. 26A presents an example where threads are allocated in coding order.
Figure 26B:
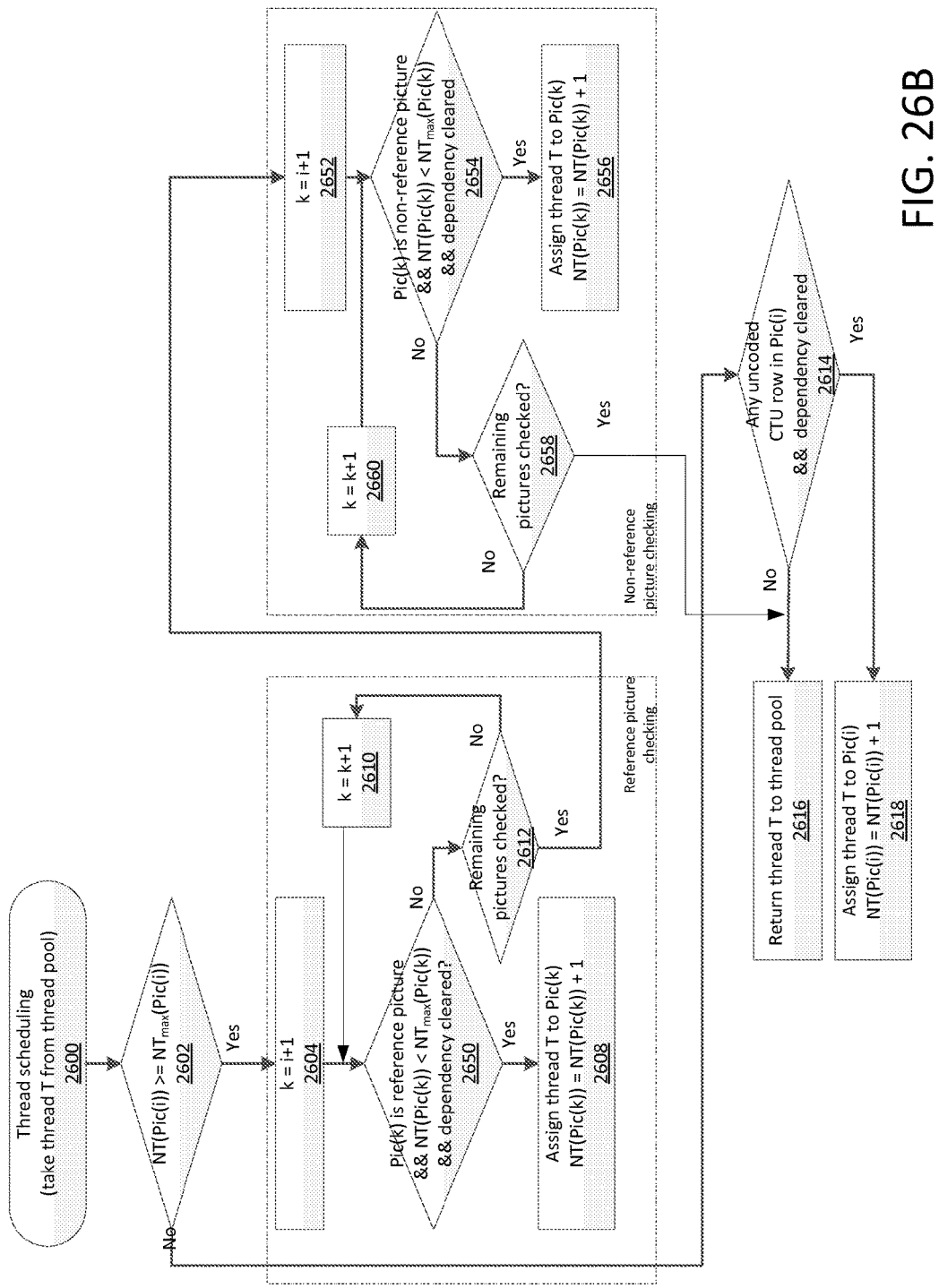
FIG. 26B presents an example where threads are allocated based on priority.

FIGS. 26A and 26B are flow charts showing examples of thread scheduling for multiple picture parallel encoding. FIG. 26A presents an example where threads may be allocated in coding order. FIG. 26B presents an example where threads are allocated based on priority.

Several example variables in FIGS. 26A, 26B, 27A and 27B may be defined. For example, Pic(i) may be defined as an i-th picture in current group of pictures encoding in parallel. $NT_{max}(P)$ may be defined as a maximum number of threads for one picture P. NT(Pic) may be defined as a number of threads working on picture Pic. Given a pool of WPP threads $\{T_k | 0 \le k \le MT\}$.

In an example, assume that threads are initially in the thread pool and no thread is yet allocated to any picture. Threads may be progressively assigned to pictures in a GOP. Assignment may begin with the first coding picture Pic(i) and proceed on to following pictures. A starting number of coding pictures may be equal to the size of the GOP, among which threads may be allocated.

As shown in FIG. 26A, a thread from the thread pool may be allocated in encoding order. At 2600 of FIG. 26A, a thread (T) may be allocated from a thread pool. At 2602, it may be determined whether the number of threads for the i-th picture (e.g., the i-th picture in the current group of pictures encoding in parallel) is greater than, or equal to, the maximum number of threads for the i-th picture (e.g., the i-th picture in the current group of pictures encoding in parallel). If the number of threads for the i-th picture is greater than or equal to the maximum number of threads for the i-th picture, the example method may move to 2604. If the number of threads for the i-th picture is not greater than or equal to the maximum number of threads for the i-th picture, the example method may move to 2614.

At 2614, it may be determined whether there are any uncoded CTU row(s) (e.g., at least one uncoded CTU row) in the i-th picture of the current group of pictures, and it may be determined whether a dependency may have been cleared. If there is not at least one CTU row in the i-th picture of the current group of picture, and/or if the dependency is not cleared, the thread may be returned to the thread pool at 2616. If there are any CTU row(s) in the i-th picture of the current group of picture, and if the dependency is cleared, the example method may move to 2618. At 2618, the thread may be assigned to the i-th picture in the current group of pictures, and the number of threads working on the i-th picture in the current group of pictures may be incremented by 1.

At 2602, it may be determined whether the number of threads for the i-th picture (e.g., the i-th picture in the current group of pictures encoding in parallel), is greater than, or equal to, the maximum number of threads for the i-th picture (e.g., the i-th picture in the current group of pictures encoding in parallel). If the number of threads for the i-th picture is greater than or equal to the maximum number of threads for the i-th picture, the example method may move to 2604. At 2604, the example method may increment to the next picture (e.g., i-th+1 picture) in the current group of pictures encoding in parallel. A check is performed, at 2606, to determine whether the number of threads for the next picture (e.g., i-th+1) is less than the maximum number of threads for the next picture (e.g., the i-th+1 picture). As shown on FIG. 26A, at 2606, it may be determined whether the dependency has been cleared. If both conditions of 2606 are satisfied (e.g., the number of threads for the next picture (e.g., i-th+1) is less than the maximum number of threads for the next picture (e.g., the i-th+1 picture), and the dependency has been cleared), the example method moves to 2608. At 2608, the thread is assigned to the next picture (e.g., the i-th+1 picture), and the number of threads for the next picture is incremented. If one, or both, conditions of 2606 are not satisfied (e.g., the number of threads for the next picture (e.g., i-th+1) is not less than the maximum number of threads for the next picture (e.g., the i-th+1 picture), and/or the dependency has not been cleared), the example method moves to 2612.

At 2612, whether the remaining pictures have been checked may be determined. If the remaining pictures have been checked, the thread may be returned to the thread pool, at 2616. If the remaining pictures have not been checked, the number of the picture is incremented, at 2610, and 2606 may be performed, as described herein.

In an example shown in FIG. 26B, a thread from the thread pool may be allocated based on priority between reference pictures and non-reference pictures. For example, a thread may be allocated to reference pictures within the set of coding pictures, for example, because more pictures depend on reference pictures, which may encourage prioritizing the completion of encoding of the reference pictures first. A thread may be allocated to non-reference pictures in encoding order, for example, when there is no available reference picture for thread assignment. In an example shown in FIG. 26B, reference pictures and non-reference pictures may be distinguished by the thread scheduling process, with reference pictures being given priority over non-reference pictures.

As shown in FIG. 26B, threads may be allocated based on priority (e.g., reference pictures having a higher priority than non-reference pictures). Many processes shown on FIG. 26A, and described herein, are shown on FIG. 26B. Where like processes are shown on FIG. 26A and FIG. 26B, like element numbers are used. For example, 2600, 2602, 2604, 2608, 2610, 2612, 2614, 2616, and 2618 are shown on FIG. 26B and FIG. 26A, to show similar processes. FIG. 26B differs, in part, from FIG. 26A, in that the example method shown in FIG. 26B may discriminate thread allocation based on whether a picture is a reference picture or a non-reference picture.

FIG. 26B may be similar to FIG. 26A with respect to 2600 through 2604. From 2604, FIG. 26B depicts the example method performing 2650, and FIG. 26A depicts the example method performing 2606. Step 2650 of FIG. 26B may differ from 2606 of FIG. 26A, in part, based on 2650 of FIG. 26B determining whether the next picture (e.g., i-th+1) picture is a reference picture. If the next picture (e.g., i-th+1) picture is a reference picture, 2650 of FIG. 26B may be equivalent to 2606 of FIG. 26A, and the remaining steps 2608, 2610, 2612, 2614, 2616, and 2618 may be similar to both the example method shown in FIG. 26B and the example method shown in FIG. 26A.

As shown in FIG. 26B, at 2650, if the next picture (e.g., i-th+1) picture is not a reference picture, at 2612, whether the remaining pictures have been checked may be determined. If the remaining pictures have not been checked, the example method may move to 2610, as described herein. If it is determined that the remaining pictures have been checked, the picture is incremented at 2652. At 2654, it may be determined whether the incremented picture is a non-reference picture, whether the number of the threads for the incremented picture is less than the maximum number of threads permitted for the incremented picture, and whether dependency has been cleared. If the conditions checked at 2654 are answered in the affirmative, the thread may be assigned to the incremented picture, and the number of threads for the incremented pictures may be incremented by 1, at 2656. The thread may be returned to the thread pool, at 2616.

If any one of the checks are answered in the negative at 2654 (e.g., if the incremented picture is a reference picture, or if the number of the threads for the incremented picture is not less than the maximum number of threads permitted for the incremented picture, or if the dependency has not been cleared), the example method may determine whether the remaining pictures have been checked, at 2658. If the remaining pictures have been checked, the thread may be returned to the thread pool, at 2616. If the remaining pictures have not been checked, the picture may be incremented, and 2654 may be performed, as described herein.

The order in which pictures of the GOP may be checked (e.g., the numbering order of pictures as enumerated by Pic(i)) may be any order. In an example, pictures may be checked in encoding order. In an example, pictures may be checked in a predetermined priority order. Index 'i' may be initially set to the value of the first picture of the GOP in the checking order, for example, when a thread scheduling process (e.g., as shown in examples in FIGS. 26A, 26B, 27A, 27B) is invoked. A thread scheduling process may check pictures progressively in checking order, for example, until a current thread is assigned to an encoding task in one of the pictures. Index 'i' may be set to the lowest value corresponding to a picture for which unscheduled encoding tasks are still remaining, for example, when it is known that some leading subset of pictures in the checking order have already been completely encoded or have already had threads assigned to relevant encoding tasks for those pictures. A thread scheduler may track which pictures still have unscheduled encoding tasks, and may check those pictures, for example, when the thread scheduler process is called. For example, a thread scheduler may avoid checking pictures that do not have unscheduled encoding tasks remaining.

A thread scheduling process, examples of which are depicted in FIGS. 26A, 26B, 27A and 27B may check whether one or multiple dependency constraints have been cleared for a picture, for a portion of a picture, for a CTU row, etc. Checking dependency constraints may determine whether a picture, a portion of a picture, a CTU row, etc. may be ready to be coded (e.g., encoded and/or decoded). Being ready for encoding may mean, for example, no outstanding dependency constraints would prevent the start of encoding, so that the thread scheduler may assign a thread to the encoding task related to the picture, the portion of the picture, the CTU row, etc. Dependency checking may include consideration of the search range (e.g., motion vector search window size) for reference pictures of both reference lists for a CTU row. For example, dependency checking may check that the pixels of any reference pictures on which the motion vector searching for the CTU row depends are already available. Dependency checking may include consideration of the dependency of a WPP thread on the above CTU row. For example, a dependency check may check that the above CTU row is already encoded, or that enough of the above CTU row is already encoded to allow a WPP thread to begin encoding the current CTU row. Dependency checking may consider both search range and CTU row dependency. Dependency checking may consider any other dependency relationship that may prevent the start of encoding for a CTU row.

A thread scheduling algorithm may be invoked, e.g., periodically, by a thread management process. A thread scheduling algorithm may be triggered, for example, when a thread completes a previously assigned task (e.g., completes encoding of an assigned WPP row) and/or when a thread is returned to the thread pool. A trigger may be active, for example, when thread re-allocation is needed.

Figure 27A:
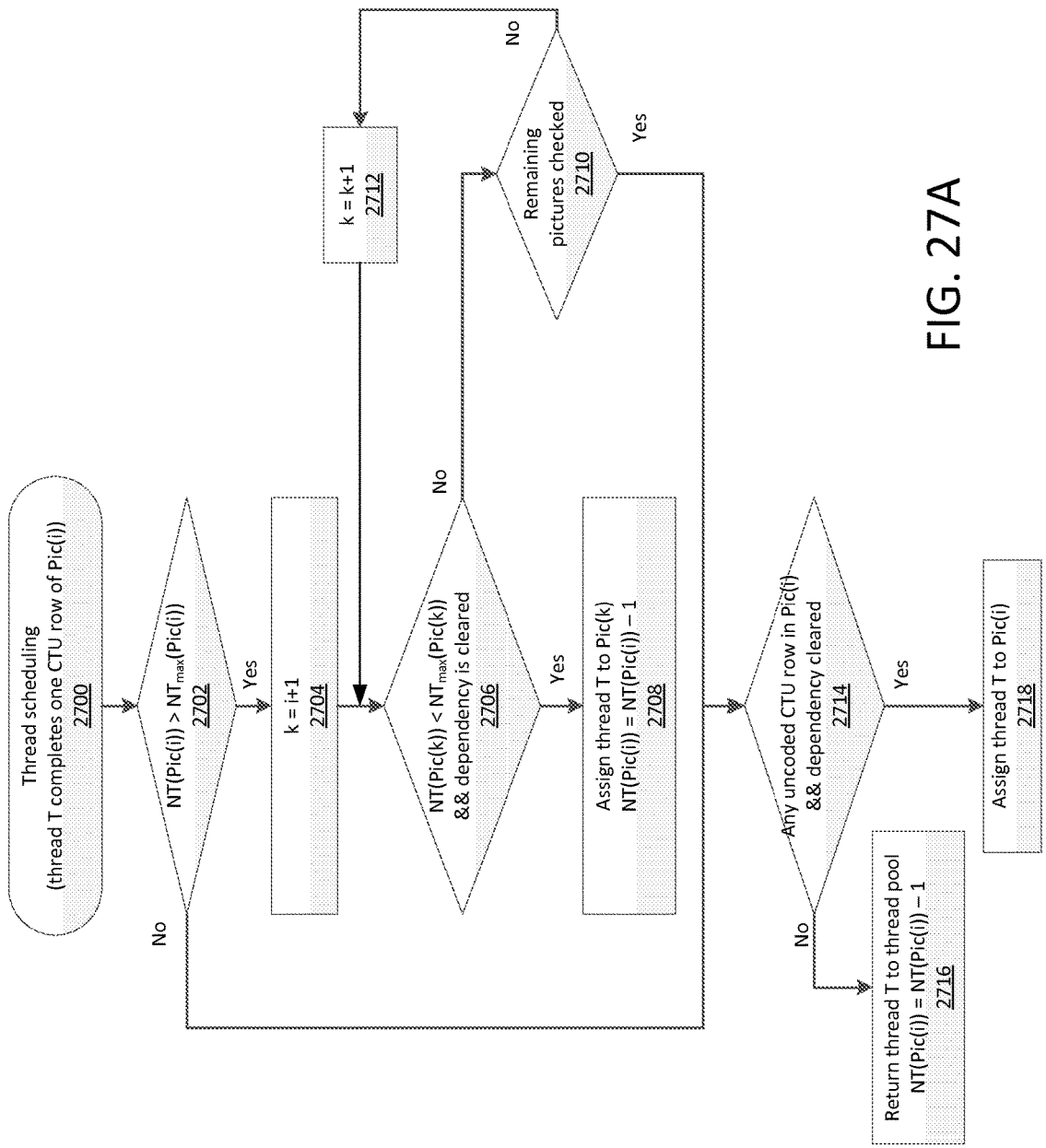
FIG. 27A presents an example where threads are migrated in coding order.
Figure 27B:
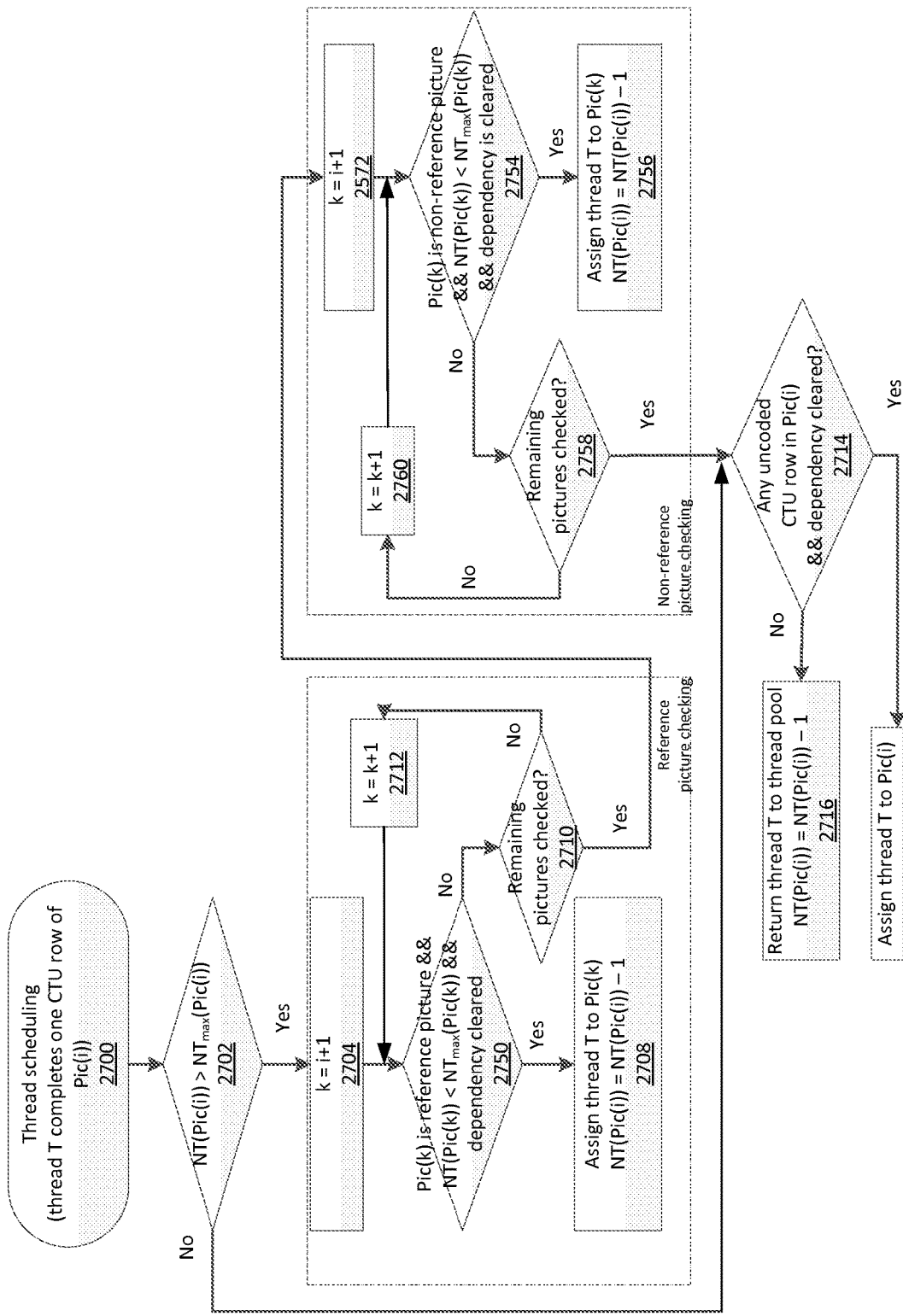
FIG. 27B presents an example where threads are migrated based on priority.

A thread migration algorithm may implement a thread migration technique. FIGS. 27A and 27B are flow charts showing examples of thread migration for multiple picture parallel encoding. FIG. 27A presents an example where threads are migrated in coding order. FIG. 27B presents an example where threads are migrated based on priority.

Threads from a thread pool may be allocated to a first picture in coding order. A thread migration algorithm, e.g., as shown in FIG. 27A or 27B, may be invoked when a thread is done (e.g. when that thread has completed its task, for example, when a WPP thread has completed encoding of a CTU row). An algorithm may migrate a thread in coding order, e.g., as shown in FIG. 27A. An algorithm may migrate a thread based on a picture's priority (e.g., reference pictures prioritized over non-reference pictures), e.g., as shown in FIG. 27B. Thread migration techniques may gradually allocate threads from a thread pool among pictures.

Thread waiting time, e.g., due to dependency of WPP threads in one picture, may be reduced, for example, by allocating threads to certain pictures evenly if such pictures have the same priority. Pictures having the same priority may be, for example, non-reference pictures or pictures of a particular temporal level (e.g., TL-3 pictures). Threads may be scheduled or migrated among pictures having the same priority, for example, in round-robin fashion.

A maximum number of threads for a picture $NT_{max}(P)$ may be set by various techniques. An example technique may set the maximum number of threads based on a reference picture or a non-reference picture. For example, reference pictures may be assigned a maximum of four threads, while non-reference pictures may be assigned a maximum of two threads (e.g. equal to the number of cores available/number of non-reference pictures). Reference pictures may be assigned a higher value of a maximum value of threads $NT_{max}(P)$ than non-reference pictures.

An example technique may set a threshold based on the temporal level a picture belongs to according to hierarchical coding structure. For example, pictures of a first temporal level may be assigned a maximum of six threads, pictures of a second temporal level may be assigned a maximum of four threads, and pictures of a third temporal level may be assigned a maximum of two threads. In an example, maximum thread assignments may refer to a maximum number of WPP threads assigned to a picture. Pictures of a higher temporal level may be assigned a lower value of a maximum number of threads $NT_{max}(P)$ than those of a lower temporal level.

An example technique may set a threshold according to a picture position in a GOP structure. For example, a first picture in a GOP may be assigned a maximum of six threads and a second picture in a GOP may be assigned a maximum of four threads. Pictures that may be expected to serve as reference pictures for a greater number of subsequent pictures may be assigned a larger value of a maximum number of threads $NT_{max}(P)$.

Multiple (e.g., two) thread pools may be used. A first thread pool may be used to encode reference pictures while a second thread pool may be used to encode non-reference pictures. Scheduling of threads from a pool to the encoding of reference pictures and non-reference pictures, respectively, may be carried out by a scheduling algorithm (e.g., example algorithms discussed herein).

Thread management may be applied, for example, to multi-GOP parallel encoding. WPP encoding threads may be allocated to more than one GOP. Threads may be allocated to multiple GOPs, for example, when there are available computation resources, such as in multi-core platforms.

For example, a first GOP may include pictures associated with different temporal levels, such as pictures in a first-temporal level and pictures in a second-temporal level. A second GOP may include pictures associated with different temporal levels, such as pictures in a first-temporal level, and pictures in a second-temporal level. The second-temporal level pictures may be, e.g., non-reference pictures, and the first-temporal level pictures may be, e.g., reference pictures. When the first-temporal level pictures of the first GOP have finished being coded, the available threads may be assigned to code the first-temporal level pictures of the second GOP. The first-temporal level pictures of the second GOP, and the second-temporal level pictures of the first GOP may be coded in parallel using their respective allocated parallel processing threads.

Threads may be managed for parallel encoding of multi-GOP pictures. In an example encoder/decoder configuration, TL-3 pictures may not be used as reference pictures. TL-0/1/2 picture encoding may not depend on TL-3 pictures in a previous GOP. TL-0/1/2 picture encoding in GOP-1 may be scheduled and completed. Encoding of TL-3 pictures (POC 1, 3, 5, and 7) in GOP-1 may start along with encoding of TL-0/1/2 pictures (POC 16, 12, 10 and 14) in GOP-2.

FIG. 22 is a diagram of an example of a multi-GOP encoding architecture. Second temporal level (e.g., TL-3) pictures of a first GOP (e.g., GOP-(n-1)) (e.g. POC 1, 3, 5, 7) and first temporal level (e.g., non-TL-3) pictures of a second GOP (e.g., GOP-n) (e.g., POC 16, 12, 10, 14) may be encoded in parallel.

A multi-GOP encoding framework may use IPWPP to encode TL-0/1/2 pictures belonging to a next GOP. A multi-GOP encoding framework may use a multi-threaded encoding framework to encode TL-3 pictures belonging to a current GOP. A multi-GOP encoding framework may be useful, for example, for computers with higher memory and a higher number of CPU cores. Intermediate encoding data for two GOPs of pictures (for example, if GOP is 8, then 16 pictures) may be maintained in a multi-GOP encoding framework.

TL-3 pictures of the current GOP and TL-0/1/2 pictures of next GOP may be encoded sequentially. TL-3 pictures of the current GOP and TL-0/1/2 pictures of next GOP may be encoded in parallel. A picture in the two sets of pictures may utilize an available number of WPP threads, e.g., a minimum number of available CPU cores or a minimum number of CTU rows in a slice, for a compression process along with an efficient thread scheduling mechanism as described herein.

TL-3 pictures of GOP-(n-1) and non-TL-3 pictures of GOP-n may be encoded in parallel. Encoding may be done asynchronously. TL-3 of GOP-(n-1) encoding may be faster than non-TL-3 of GOP-n encoding. Free threads, e.g., threads released from TL-3 encoding, may be allocated to non-TL-3 pictures in GOP-n to accelerate GOP-n non-TL-3 picture encoding.

A thread scheduling algorithm, e.g., as shown in FIGS. 26A, 26B, and a thread migration algorithm, e.g., as shown in FIGS. 27A, 27B, may be extended, for example, by increasing the range of picture checking for thread assignment. This may be used, for example, in multi-GOP parallel encoding. This technique may not differentiate which GOP a picture belongs to. There may be one thread pool from a thread management point of view.

A thread pool may be separated into multiple pools, for example, based on a number of GOPs that are being coded in parallel. For example, there may be two thread pools for parallel encoding two GOPs. A thread pool may be allocated to coding a GOP, for example, to avoid interference among GOPs. With multiple thread pools, GOP encoding may be in order. Some applications, such as live video broadcasting, may have a delay requirement, which may favor one technique over another. In examples, the parallel processing threads may be allocated to the first GOP and/or the second GOP based on a priority.

Figure 23:
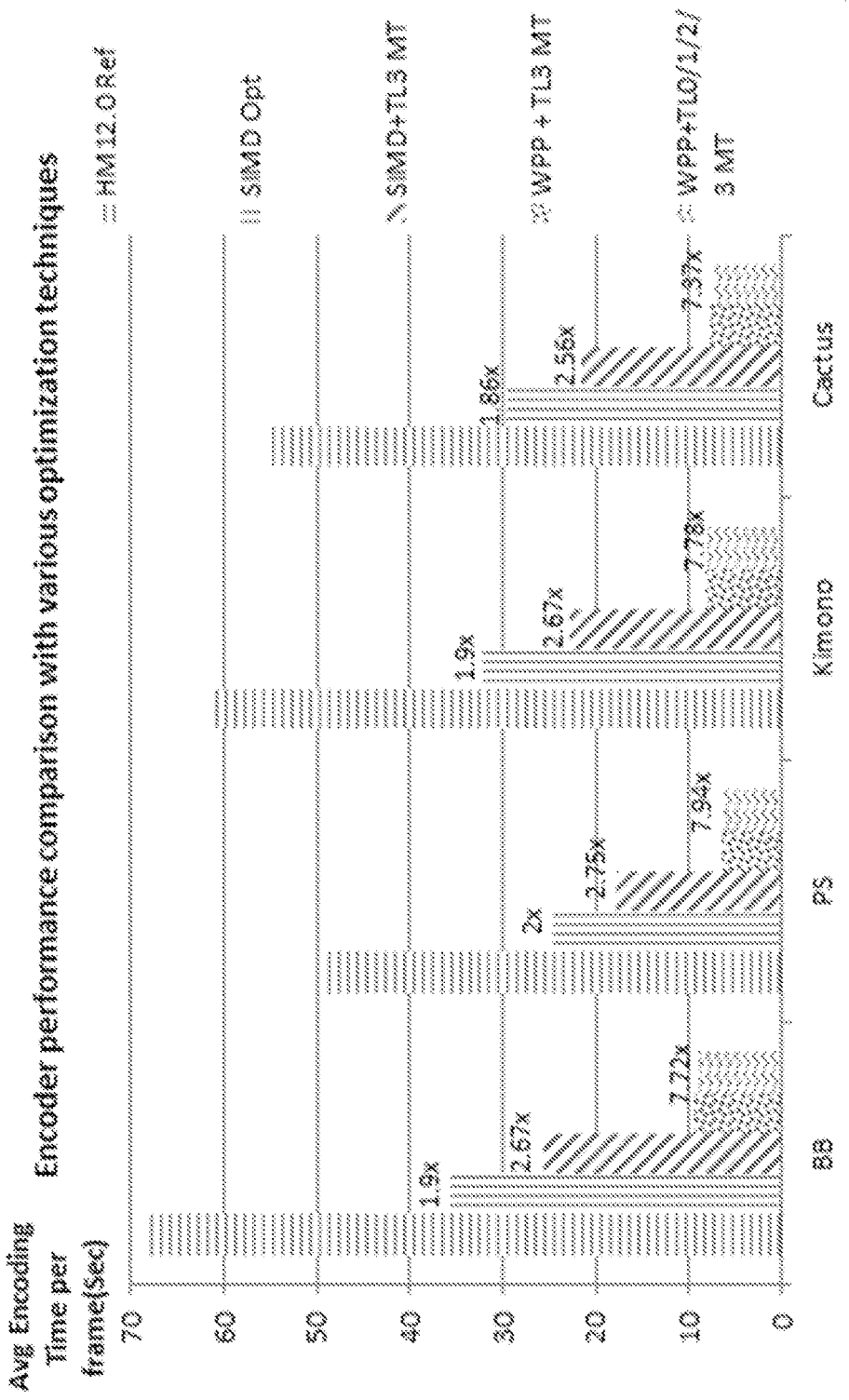
FIG. 23 shows an example of average encoding time per frame for different bit streams using different examples of HEVC optimization techniques.

FIG. 23 shows an example of average encoding time per frame for different bit streams using different examples of HEVC optimization techniques. Bitstream examples are BasketballDrive (BB), ParkScene (PS), Kimono and Cactus. Simulations were performed on a desktop computer with an Intel Core i7 2600 processor having four cores running at 3.4 GHz. Five optimization results are shown: HM reference encoder, SIMD Optimization, SIMD optimization with WPP optimization, Multi-threaded processing for TL-3 pictures plus SIMD optimization with WPP optimization and Multi-threaded processing for TL-0/1/2 plus Multi-threaded processing for TL-3 pictures and SIMD optimization with WPP optimization.

Figure 24:
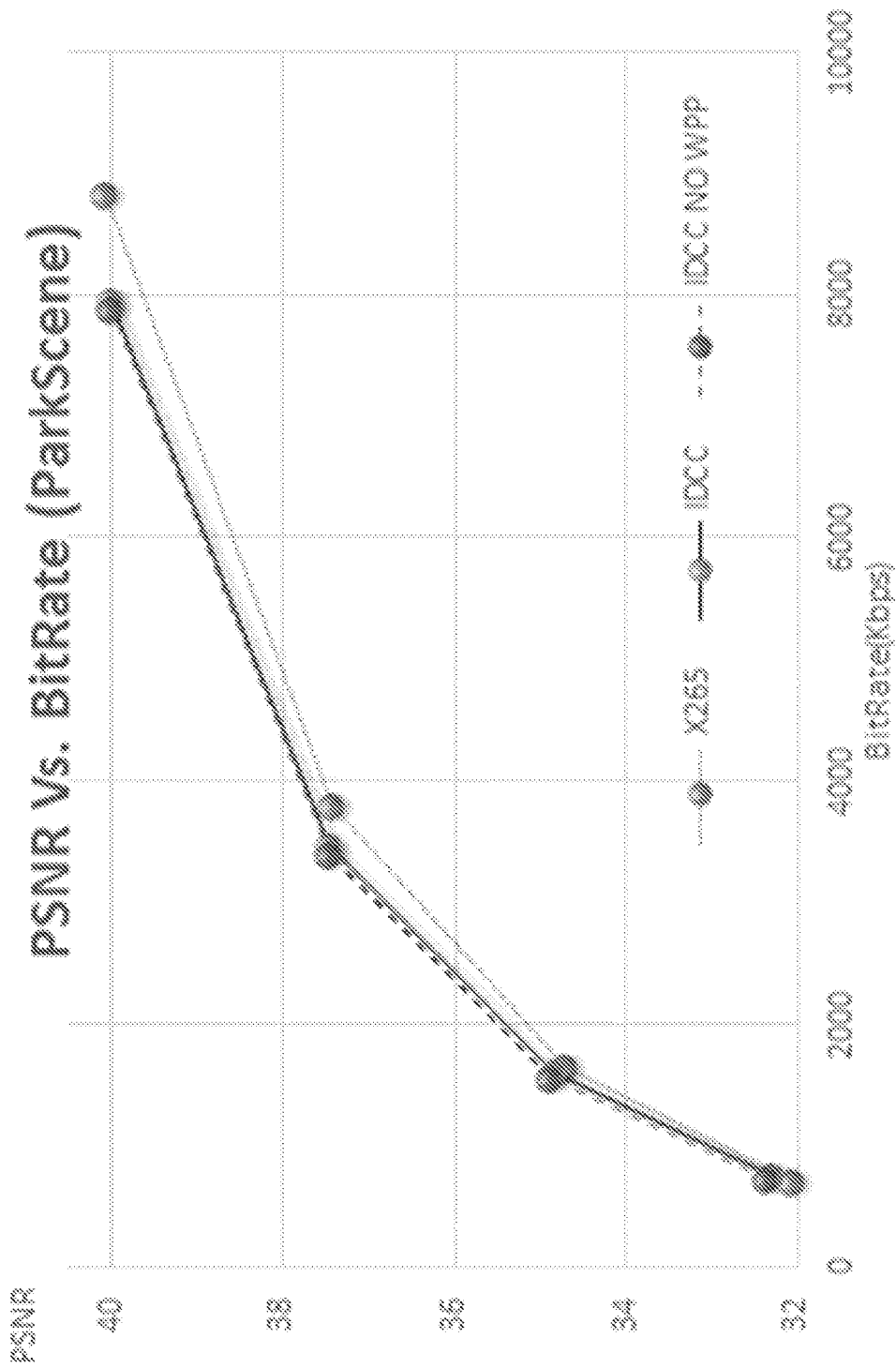
FIG. 24 shows Rate-Distortion (RD) curves for an optimized HEVC encoder compared to an X265 encoder (v 1.0) for a ParkScene bit stream.

FIG. 24 shows an example of Rate-Distortion (RD) curves for an optimized HEVC encoder compared to an X265 encoder (v 1.0) for a ParkScene bit stream.

Figure 25:
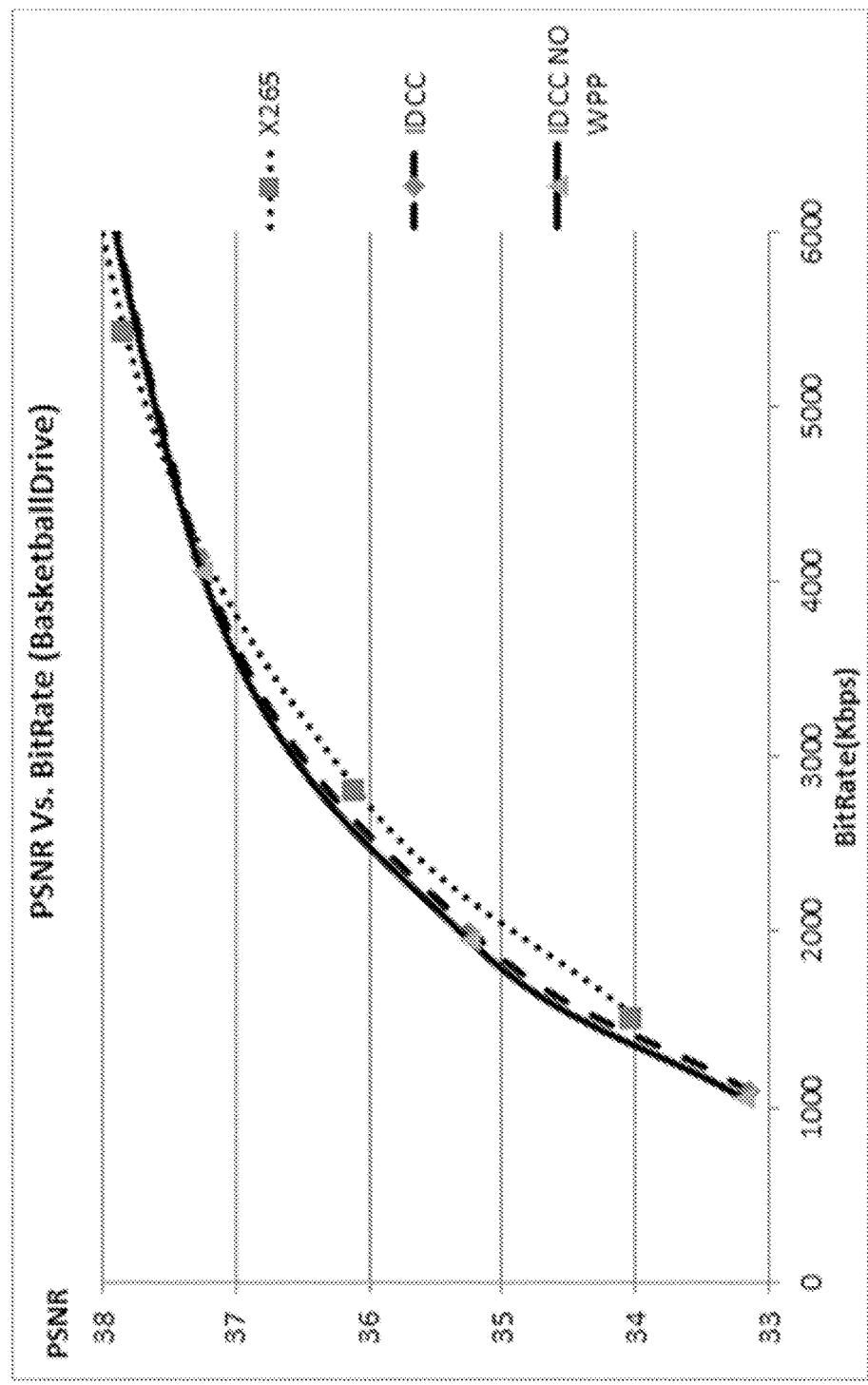
FIG. 25 shows Rate-Distortion (RD) curves for an optimized HEVC encoder compared to an X265 encoder (v 1.0) for a BasketballDrive bit stream.

FIG. 25 shows an example of Rate-Distortion (RD) curves for an optimized HEVC encoder compared to an X265 encoder (v 1.0) for a BasketballDrive bit stream.

Figure 28A:
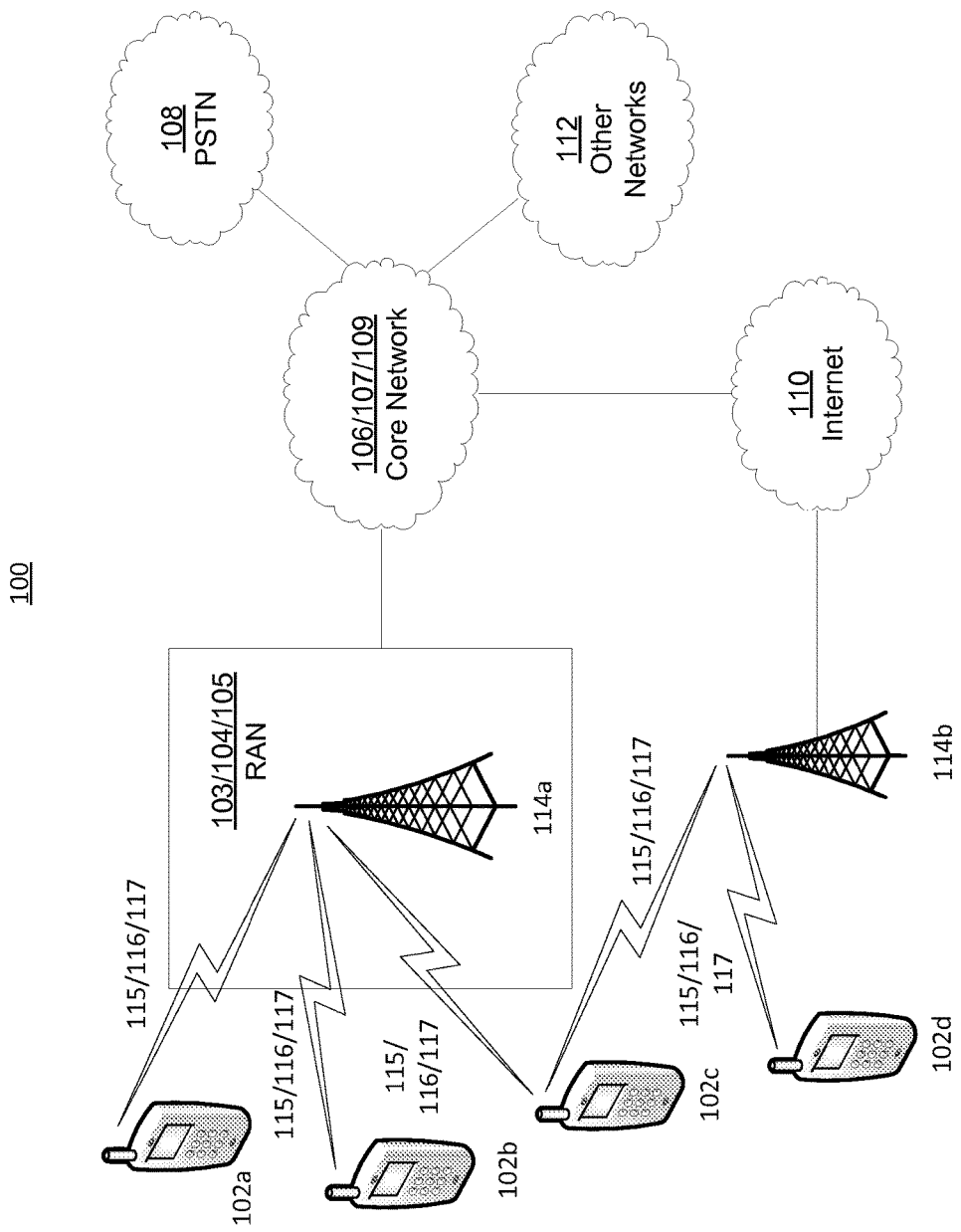
FIG. 28A is a system diagram of an example communications system in which one or more disclosed techniques may be implemented.

FIG. 28A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access techniques, such as code division multiple access (CDMA), time division multiple access (TDMA), frequency division multiple access (FDMA), orthogonal FDMA (OFDMA), single-carrier FDMA (SC-FDMA), and the like.

As shown in FIG. 28A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 28A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 28A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 28A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 28A may be configured to communicate with the base station 114a, which may employ a cellular-based radio technology, and with the base station 114b, which may employ an IEEE 802 radio technology.

Figure 28B:
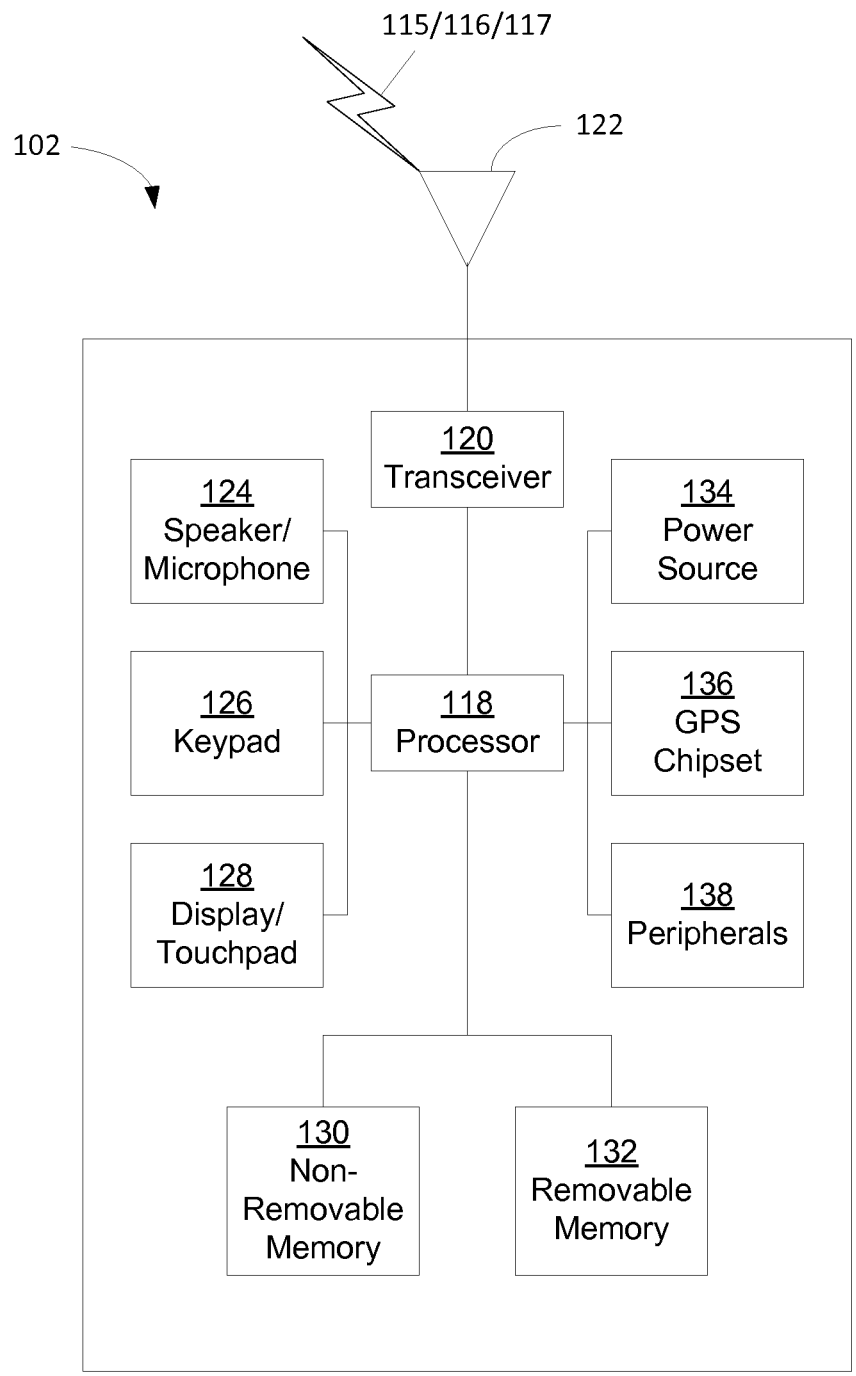
FIG. 28B is a system diagram of an example wireless transmit/receive unit (WTRU) that may be used within the communications system illustrated in FIG. 28A.

FIG. 28B is a system diagram of an example WTRU 102. As shown in FIG. 28B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 28B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 28B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 28B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination technique while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 28C:
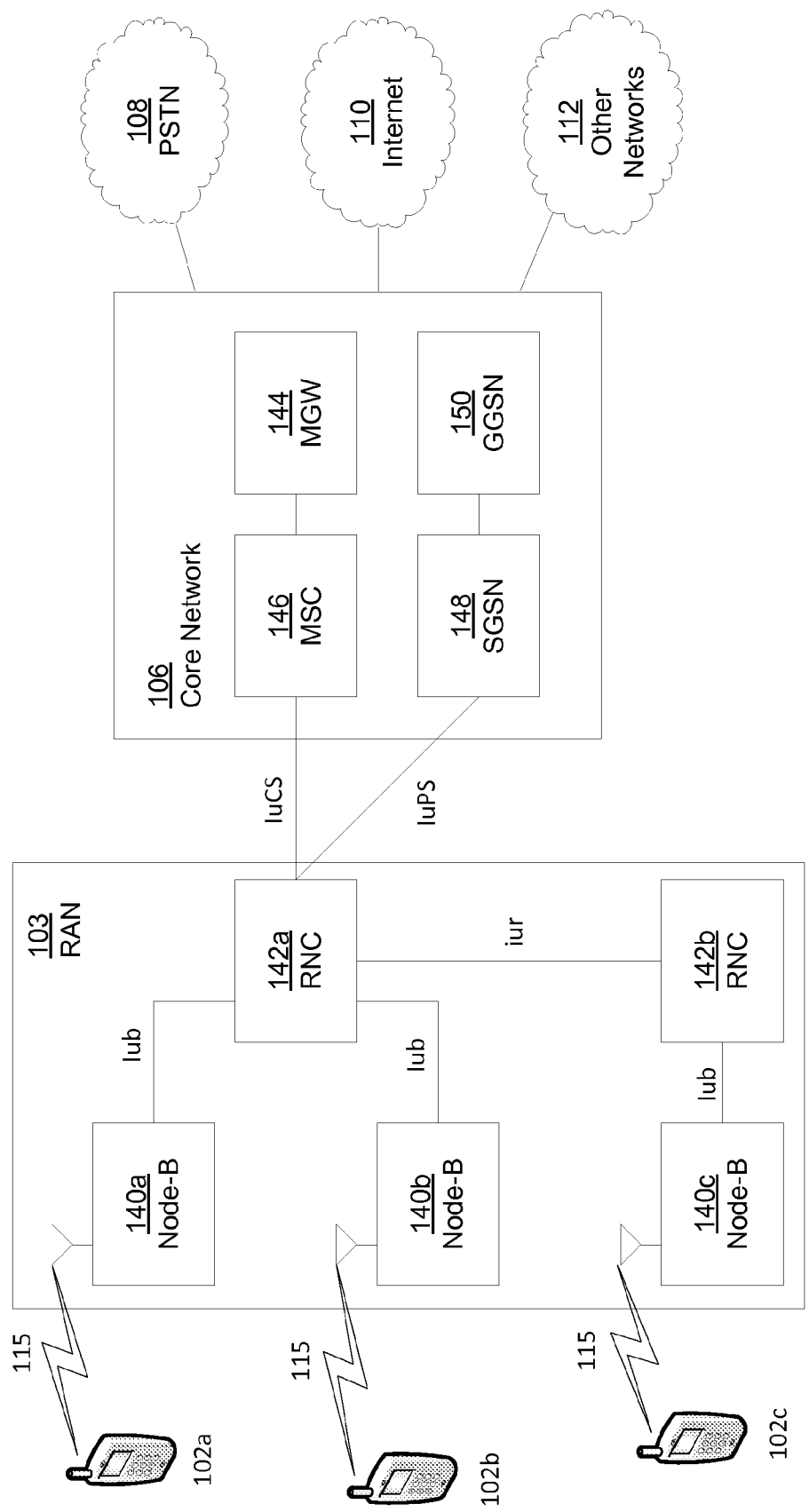
FIG. 28C is a system diagram of an example radio access network and an example core network that may be used within the communications system illustrated in FIG. 28A.

FIG. 28C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 28C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 28C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 28C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 28D:
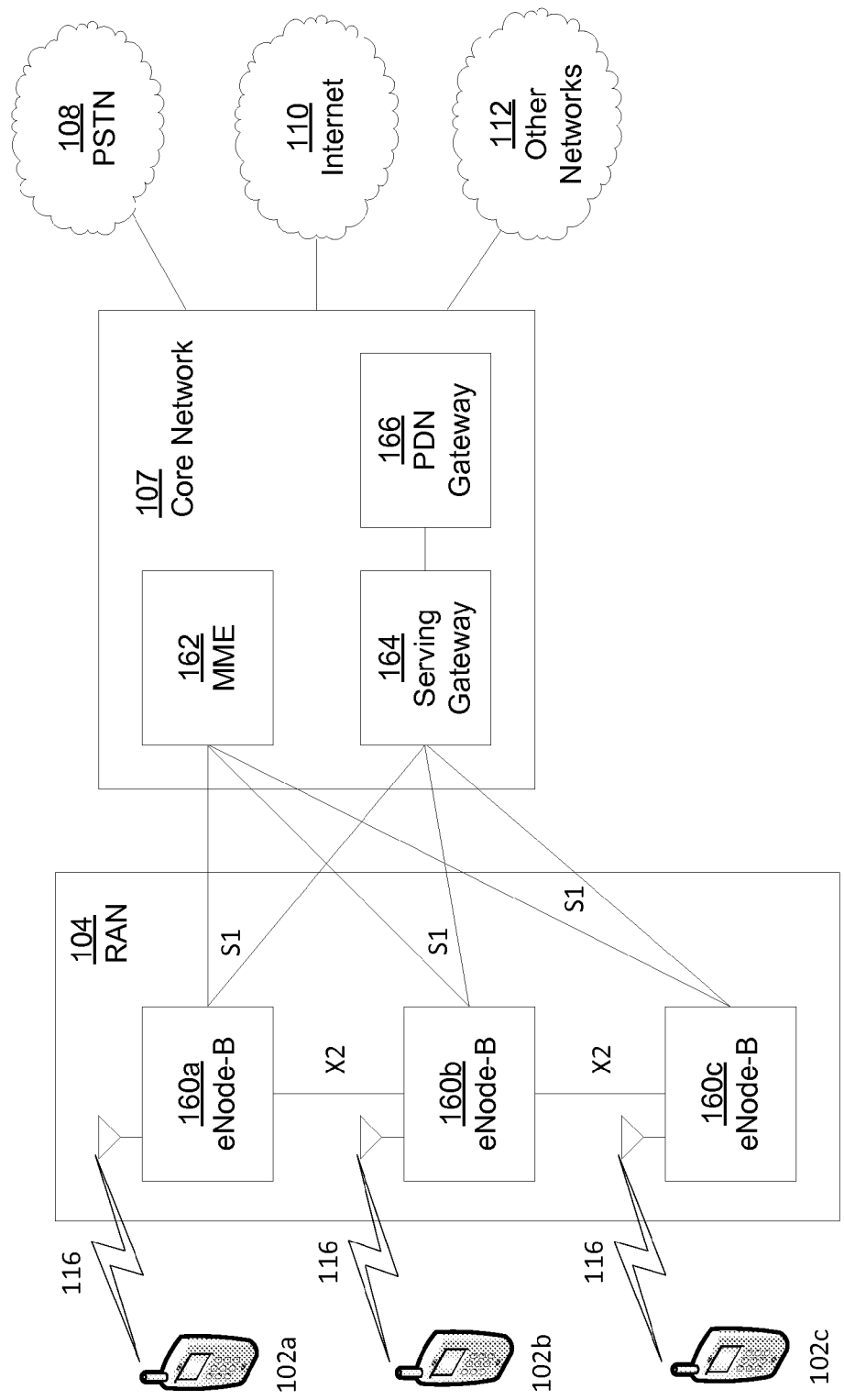
FIG. 28D is a system diagram of another example radio access network and an example core network that may be used within the communications system illustrated in FIG. 28A.

FIG. 28D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 28D, the eNode-Bs 160a, 160b, 160c may communicate with one another over an X2 interface.

The core network 107 shown in FIG. 28D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 28E:
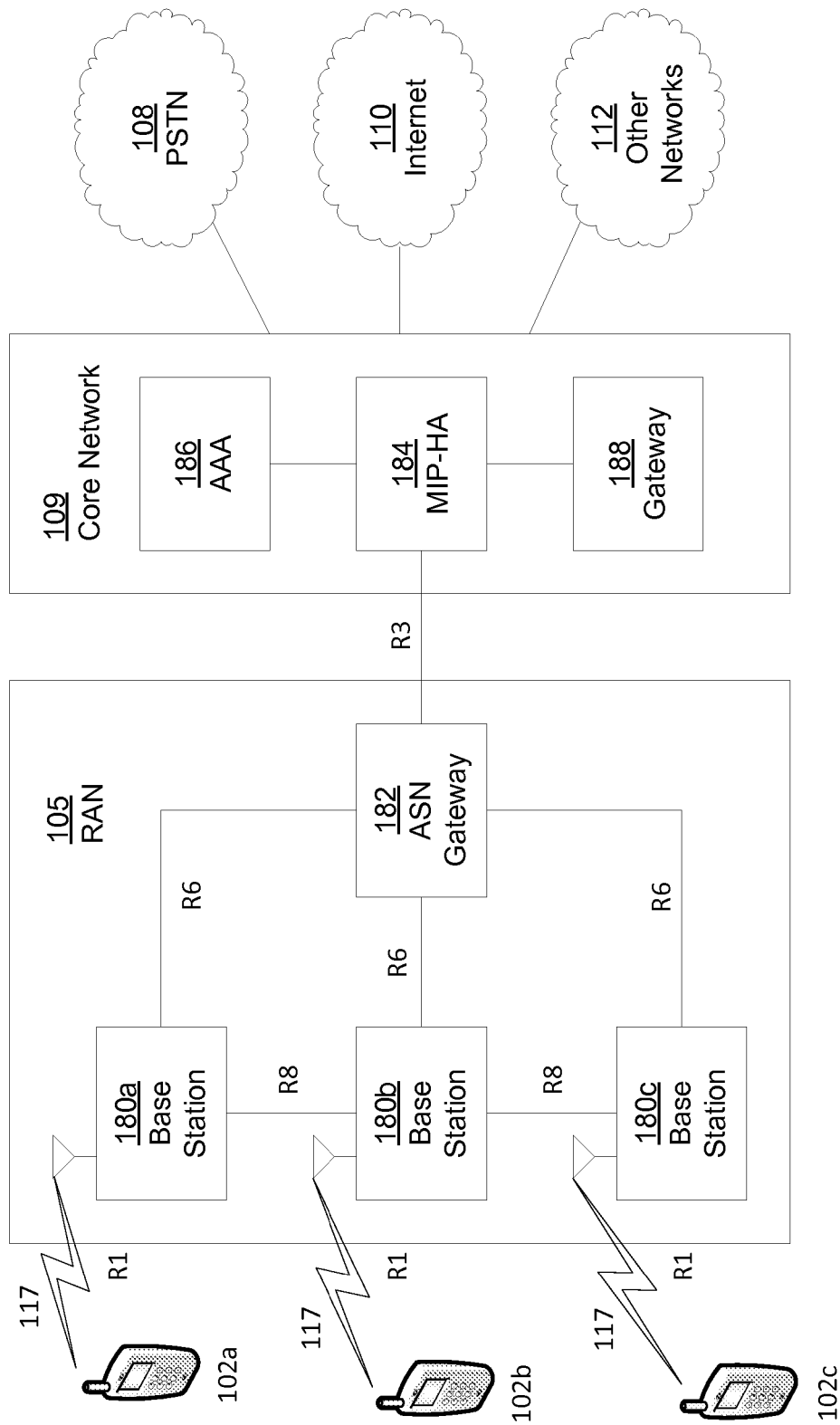
FIG. 28E is a system diagram of another example radio access network and an example core network that may be used within the communications system illustrated in FIG. 28A.

FIG. 28E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 28E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 28E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 28E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the techniques described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A video encoding device comprising:
a processor configured to:
receive a video sequence comprising a plurality of first-temporal level pictures associated with a first temporal level and a plurality of second-temporal level pictures associated with a second temporal level;
allocate, based on temporal level priority, a first number of parallel processing threads for encoding the first-temporal level pictures and a second number of parallel processing threads for encoding the second-temporal level pictures, wherein on a condition that the first temporal level is associated with a higher priority than the second temporal level, the first number of the parallel processing threads is larger than the second number of the parallel processing threads; and
encode, in parallel, the first-temporal level pictures and the second-temporal level pictures based on the allocation of the first number of parallel processing threads and the second number of parallel processing threads.

2. The video encoding device of claim 1, wherein a first group of pictures (GOP) comprises a plurality of first-GOP first-temporal level pictures and a plurality of first-GOP second-temporal level pictures; and a second GOP comprises a plurality of second-GOP first-temporal level pictures and a plurality of second-GOP second-temporal level pictures, and wherein the processor is further configured to:
encode, when the first-GOP first temporal level pictures have finished being encoded, the second-GOP first-temporal level pictures using the first number of parallel processing threads that are allocated for encoding the first-temporal level pictures.

3. The video encoding device of claim 2, wherein the processor is further configured to encode, in parallel, the second-GOP first-temporal level pictures and the first-GOP second-temporal level pictures using their respective allocated parallel processing threads.

4. The video encoding device of claim 1, wherein the processor is further configured to allocate a portion of the first number of parallel processing threads to a first picture within the first-temporal level pictures based on an amount of times other pictures reference the first picture.

5. The video encoding device of claim 1, wherein the processor is further configured to:
encode the first-temporal level pictures in parallel using the allocated first number of the parallel processing threads; and
encode the second-temporal level pictures in parallel using the allocated second number of the parallel processing threads.

6. The video encoding device of claim 1, wherein the first number of the parallel processing threads and the second number of the parallel processing threads are wavefront parallel processing (WPP) threads.

7. The video encoding device of claim 1, wherein the second-temporal level pictures are non-reference pictures, and the first-temporal level pictures are reference pictures.

8. The video encoding device of claim 1, wherein the temporal level priority is at least partially based upon at least one of the second-temporal level pictures referencing at least one of the first-temporal level pictures.

9. The video encoding device of claim 1, wherein the first-temporal level pictures and the second-temporal level pictures belong to a same group of pictures (GOP), and the processor is further configured to:
allocate the second number of parallel processing threads among the second-temporal level pictures in a round robin style.

10. The video encoding device of claim 1, wherein the first-temporal level pictures and the second-temporal level pictures belong to a same group of pictures (GOP), and the processor is further configured to:
evenly distribute the second number of parallel processing threads among the second-temporal level pictures.

11. The video encoding device of claim 1, wherein a first group of pictures (GOP) comprises a first-GOP first-temporal level pictures and a first-GOP second-temporal level pictures; and a second GOP comprises a second-GOP first-temporal level pictures and a second-GOP second-temporal level pictures, and wherein the processor is further configured to:
allocate available parallel processing threads to the first GOP and the second GOP based at least in part on a GOP priority.

12. The video encoding device of claim 1, wherein the first temporal level is associated with a higher priority than the second temporal level, and the first-temporal level pictures are associated with a higher maximum number of threads per picture than the second-temporal level pictures.

13. The video encoding device of claim 1, wherein a first group of pictures (GOP) comprises a first-GOP first-temporal level pictures and a first-GOP second-temporal level pictures, and a second GOP comprises a second-GOP first-temporal level pictures and a second-GOP second-temporal level pictures, and wherein the processor is further configured to:
allocate a thread pool to at least one of the first GOP and the second GOP to avoid interference among GOPs.

14. The video encoding device of claim 1, wherein the first-temporal level pictures and the second-temporal level pictures belong to a same group of pictures (GOP), and the processor is further configured to:
determine a number of parallel processing threads allocated for a first picture that exceeds a maximum number of the parallel processing threads for the first picture; and
assign, to a second picture, the number of parallel processing threads allocated for the first picture that exceeds the maximum number of the parallel processing threads for the first picture.

15. A method for encoding a video sequence via parallel processing threads, the method comprising:
receiving a video sequence comprising a plurality of first-temporal level pictures associated with a first temporal level and a plurality of second-temporal level pictures associated with a second temporal level;
allocating, based on temporal level priority, a first number of parallel processing threads for encoding the first-temporal level pictures and a second number of parallel processing threads for encoding the second-temporal level pictures, wherein on a condition that the first temporal level is associated with a higher priority than the second temporal level, the first number of the parallel processing threads is larger than the second number of the parallel processing threads; and
encoding, in parallel, the first-temporal level pictures and the second-temporal level pictures based on the allocation of the first number of parallel processing threads and the second number of parallel processing threads.

16. The method of claim 15, wherein a first group of pictures (GOP) comprises a plurality of first-GOP first-temporal level pictures and a plurality of first-GOP second-temporal level pictures, and a second GOP comprises a plurality of second-GOP first-temporal level pictures and a plurality of second-GOP second-temporal level pictures, the method further comprising: encoding, when the first-GOP first temporal level pictures have finished being encoded, the second-GOP first-temporal level pictures using the first number of parallel processing threads that are allocated for encoding the first-temporal level pictures.

17. The method of claim 16, further comprising:
encoding, in parallel, the second-GOP first-temporal level pictures and the first-GOP second-temporal level pictures using their respective allocated parallel processing threads.

18. The method of claim 15, further comprising:
allocating a portion of the first number of parallel processing threads to a first picture within the first-temporal level pictures based on an amount of times other pictures reference the first picture.

19. The method of claim 15, further comprising:
encoding the first-temporal level pictures in parallel using the allocated first number of the parallel processing threads; and
encoding the second-temporal level pictures in parallel using the allocated second number of the parallel processing threads.

20. The method of claim 15, wherein the first number of the parallel processing threads and the second number of the parallel processing threads are wavefront parallel processing (WPP) threads.

21. The method of claim 15, wherein the second-temporal level pictures are non-reference pictures, and the first-temporal level pictures are reference pictures.

22. The method of claim 15, wherein the temporal level priority is at least partially based upon at least one of the second-temporal level pictures referencing at least one of the first-temporal level pictures.

23. The method of claim 15, wherein the first-temporal level pictures and the second-temporal level pictures belong to a same group of pictures (GOP), the method further comprising:
allocating the second number of parallel processing threads among the second-temporal level pictures in a round robin style.

24. The method of claim 15, wherein the first-temporal level pictures and the second-temporal level pictures belong to a same group of pictures (GOP), the method further comprising:
evenly distributing the second number of parallel processing threads among the second-temporal level pictures.

25. The method of claim 15, wherein a first group of pictures (GOP) comprises a first-GOP first-temporal level pictures and a first-GOP second-temporal level pictures, and a second GOP comprises a second-GOP first-temporal level pictures and a second-GOP second-temporal level pictures, the method further comprising:

allocating available parallel processing threads to the first GOP and the second GOP based at least in part on a GOP priority.

26. The method of claim 15, wherein the first temporal level is associated with a higher priority than the second temporal level, and the first-temporal level pictures are associated with a higher maximum number of threads per picture than the second-temporal level pictures.

* * * * *